(12) United States Patent
Hao et al.

(10) Patent No.: US 12,494,995 B2
(45) Date of Patent: Dec. 9, 2025

(54) PACKET FORWARDING METHOD AND APPARATUS

(71) Applicant: HUAWEI TECHNOLOGIES CO., LTD., Shenzhen (CN)

(72) Inventors: Weiguo Hao, Nanjing (CN); Yang Pan, Nanjing (CN); Qingbo Yu, Nanjing (CN); Jun Li, Nanjing (CN); Yanxiang Hou, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 2 days.

(21) Appl. No.: 18/598,748

(22) Filed: Mar. 7, 2024

(65) Prior Publication Data

US 2024/0267324 A1 Aug. 8, 2024

Related U.S. Application Data

(63) Continuation of application No. PCT/CN2022/107498, filed on Jul. 22, 2022.

(30) Foreign Application Priority Data

Oct. 29, 2021 (CN) .......................... 202111268472.1

(51) Int. Cl.
*H04L 45/00* (2022.01)
*H04L 45/02* (2022.01)
*H04L 45/12* (2022.01)

(52) U.S. Cl.
CPC .............. *H04L 45/38* (2013.01); *H04L 45/04* (2013.01); *H04L 45/123* (2013.01)

(58) Field of Classification Search
CPC ........ H04L 45/38; H04L 45/04; H04L 45/123; H04L 45/02; H04L 49/30; H04L 45/00; H04L 45/12; H04L 45/14; H04L 45/28
See application file for complete search history.

(56) References Cited

U.S. PATENT DOCUMENTS

| | | | |
|---|---|---|---|
| 7,633,940 B1 * | 12/2009 | Singh | H04L 47/30 370/389 |
| 10,355,981 B1 * | 7/2019 | Matthews | H04L 45/22 |
| 2019/0158939 A1 * | 5/2019 | Frankel | H04Q 11/0005 |
| 2019/0238449 A1 * | 8/2019 | Michael | H04L 45/123 |
| 2021/0119938 A1 | 4/2021 | Pelekhaty et al. | |
| 2022/0200901 A1 * | 6/2022 | Zhao | H04L 45/42 |

FOREIGN PATENT DOCUMENTS

| | | |
|---|---|---|
| CN | 103428103 A | 12/2013 |
| EP | 4398542 A1 | 7/2024 |

* cited by examiner

*Primary Examiner* — Benjamin M Thieu
(74) *Attorney, Agent, or Firm* — Leydig, Voit & Mayer, Ltd.

(57) ABSTRACT

A packet forwarding method and apparatus are described that pertain to the field of communication technologies. During selecting, from outbound interfaces of a plurality of forwarding chips, an outbound interface used for packet forwarding, a chassis-shaped device considers both: a role of the outbound interface (whether the outbound interface is an outbound interface of a shortest path or an outbound interface of a non-shortest path), and a congested state of the outbound interface. As such, the chassis-shaped device flexibly selects a forwarding path for a data packet based on a congestion situation of the forwarding path. In this way, an application of an adaptive routing technology is extended to the chassis-shaped device.

20 Claims, 10 Drawing Sheets

PACKET FORWARDING METHOD AND APPARATUS

CROSS-REFERENCE TO RELATED APPLICATIONS

This application is a continuation of International Application No. PCT/CN2022/107498, filed on Jul. 22, 2022, which claims priority to Chinese Patent Application No. 202111268472.1, filed on Oct. 29, 2021. The disclosures of the aforementioned applications are hereby incorporated by reference in their entireties.

TECHNICAL FIELD

This application relates to the field of communication technologies, and in particular, to a packet forwarding method and apparatus.

BACKGROUND

Adaptive routing is a packet forwarding mechanism wherein a forwarding device preferentially uses a shortest path for packet forwarding, to ensure a low delay. When the shortest path is congested, a non-congested non-shortest path is used for packet forwarding, to increase a throughput rate.

In a related technology, an adaptive routing technology is implemented based on a proprietary routing protocol, such as for example, an OpenSM (an infiniband compliant subnet manager) in an infiniband (IB) network. In addition, current adaptive routing is applied to only a case-shaped device. The case-shaped device is of a single-chip architecture. A single chip selects, for packet forwarding, a path based on a congested state of each outbound interface and a congested state of a remote device.

The foregoing adaptive routing method is applicable to only the case-shaped device, but it is difficult to apply the method to a chassis-shaped device.

SUMMARY

This application provides a packet forwarding method and apparatus, to support a chassis-shaped device to implement adaptive routing. Technical solutions are as follows:

According to a first aspect, a packet forwarding method is provided. The method is applied to a chassis-shaped device including a plurality of forwarding chips. For example, the method is performed by a first chassis-shaped device including N forwarding chips (N is an integer greater than or equal to 2). The method includes: receiving a first data packet from a first host; obtaining M outbound interfaces corresponding to the first data packet; selecting a target outbound interface from the M outbound interfaces based on a congested state of each of the M outbound interfaces and a role of each outbound interface, where the role of the outbound interface includes an outbound interface of a shortest path between the first chassis-shaped device and a second chassis-shaped device and an outbound interface of a non-shortest path between the first chassis-shaped device and the second chassis-shaped device; and sending the first data packet to the second chassis-shaped device through the target outbound interface.

In the method, when selecting, from outbound interfaces of the plurality of forwarding chips, an outbound interface used for packet forwarding, the chassis-shaped device not only considers whether the outbound interface is an outbound interface of a shortest path or an outbound interface of a non-shortest path, but also considers a congested state of the outbound interface, so that the chassis-shaped device flexibly selects a forwarding path for a data packet based on a congestion situation of the forwarding path. In this way, an application of an adaptive routing technology is extended to the chassis-shaped device.

In a possible implementation, the shortest path is a direct link between the first chassis-shaped device and the second chassis-shaped device, and the non-shortest path is a path connecting the first chassis-shaped device and the second chassis-shaped device through a third chassis-shaped device.

The direct connection includes but is not limited to a physical direct connection or a logical direct connection. For example, the physical direct connection means that the first chassis-shaped device is connected to the second chassis-shaped device through an optical fiber, a coaxial cable, or a digital subscriber line (DSL), or in another wired manner. For example, the logical direct connection means that the first chassis-shaped device and the second chassis-shaped device are reachable in one hop. In other words, the second chassis-shaped device is a next hop node (next hop) of the first chassis-shaped device in an IP network. When the logical direct connection is used, one or more layer 2 network devices (e.g., a layer 2 switch) optionally exist between the first chassis-shaped device and the second chassis-shaped device.

Optionally, the non-shortest path is a path passing through one hop of intermediate node, and the intermediate node is the third chassis-shaped device; or the non-shortest path is a path passing through a plurality of hops of intermediate nodes, and the plurality of hops of intermediate nodes not only include the third chassis-shaped device, but also include another chassis-shaped device.

In the implementation, adaptive routing can be applied to a network in which chassis-shaped devices are directly connected. The chassis-shaped devices are directly connected, to improve a device integration degree, and reduce network power consumption and networking costs.

In a possible implementation, before the selecting a target outbound interface from the M outbound interfaces based on a congested state of each of the M outbound interfaces and a role of each outbound interface, the method further includes: determining the role of each of the M outbound interfaces based on a destination Internet protocol IP address of the first data packet and a first forwarding entry stored in the first chassis-shaped device, where the first forwarding entry includes a correspondence among a route prefix, an equal-cost multi-path ECMP group, and a role of an outbound interface in the ECMP group, the route prefix includes a prefix of the destination IP address of the first data packet, and the ECMP group includes the M outbound interfaces.

In the implementation, a forwarding entry applicable to adaptive routing is introduced. Because the outbound interface of the shortest path and the outbound interface of the non-shortest path are placed in a same ECMP group, and whether an outbound interface is the outbound interface of the shortest path or the outbound interface of the non-shortest path is identified by using a role, so that the outbound interface of the shortest path is preferentially selected for forwarding during packet forwarding, to reduce implementation complexity of adaptive routing.

In a possible implementation, before forwarding a packet based on the first forwarding entry, the first chassis-shaped device further receives a plurality of border gateway protocol BGP packets from the second chassis-shaped device, where each of the plurality of BGP packets includes the route prefix and an autonomous system AS path attribute; and generates the first forwarding entry based on route prefixes and AS path attributes in the plurality of BGP packets.

In the implementation, a forwarding entry used for adaptive routing can be generated based on a standard BGP protocol, to resolve a technical problem in the conventional technology that an adaptive routing technology depends on a proprietary routing protocol. In this way, a device does not need to support the proprietary routing protocol, to lower a requirement on the device.

In a possible implementation, the plurality of BGP packets include a first BGP packet and a second BGP packet, a quantity of AS numbers in an AS path attribute of the first BGP packet is a specified quantity, a quantity of AS numbers in an AS path attribute of the second BGP packet is greater than the specified quantity, and the generating the first forwarding entry based on the plurality of BGP packets includes: obtaining a shortest path route based on the first BGP packet, where the shortest path route indicates a correspondence between the route prefix and the outbound interface of the shortest path; obtaining a non-shortest path route based on the second BGP packet, where the non-shortest path route indicates a correspondence between the route prefix and the outbound interface of the non-shortest path; and generating the first forwarding entry based on the shortest path route and the non-shortest path route.

In the implementation, the shortest path route and the non-shortest path route can be obtained based on an AS path attribute in a BGP. In this way, the device does not need to learn of the shortest path route and the non-shortest path route based on the proprietary routing protocol, to reduce implementation complexity.

In a possible implementation, the AS number in the AS path attribute of the first BGP packet is an AS number of the second chassis-shaped device, and the AS number in the AS path attribute of the second BGP packet is an AS number of the second chassis-shaped device and an AS number of the third chassis-shaped device.

In the implementation, the chassis-shaped device can determine, based on whether the AS path attribute includes only one AS number or includes two AS numbers, whether a route in a BGP packet is the shortest path route or the non-shortest path route. In this way, an implementation is simple.

In a possible implementation, before forwarding a packet based on the first forwarding entry, the first chassis-shaped device further allocates the ECMP group to the second chassis-shaped device.

In the implementation, the chassis-shaped device needs to maintain only one ECMP group for each destination chassis, to reduce processing resources and storage resources consumed by the chassis-shaped device to maintain the ECMP group.

In a possible implementation, the ECMP group includes a first outbound interface of a first forwarding chip, the first outbound interface is configured to be connected to the second chassis-shaped device, the first forwarding chip is any one of the N forwarding chips, and the method further includes: receiving a first notification message from the first forwarding chip, where the first notification message indicates that the first outbound interface of the first forwarding chip is in a faulty state; and deleting the first outbound interface from the ECMP group in the first forwarding entry based on the first notification message.

In the implementation, when an outbound interface of an intra-chassis forwarding chip is faulty, the faulty outbound interface may be deleted from the ECMP group, to facilitate fast failure convergence.

In a possible implementation, when the outbound interface of the shortest path is in a non-congested state, the target outbound interface is the outbound interface of the shortest path.

In the implementation, a light-load shortest path is preferentially selected for packet forwarding, to reduce a packet forwarding delay.

In a possible implementation, the M outbound interfaces include a plurality of outbound interfaces of the shortest path between the first chassis-shaped device and the second chassis-shaped device, the plurality of outbound interfaces of the shortest path include a local outbound interface and an inter-chip outbound interface, and when the local outbound interface and the inter-chip outbound interface each are in a non-congested state, the target outbound interface is the local outbound interface, the local outbound interface is an outbound interface of a forwarding chip that receives the first data packet in the first chassis-shaped device, and the inter-chip outbound interface is an outbound interface of another forwarding chip different from the forwarding chip that receives the first data packet in the first chassis-shaped device.

In the implementation, when there are a plurality of outbound interfaces of the shortest path, a local outbound interface of a chip is preferentially selected for packet forwarding, to reduce a time period of forwarding a packet in the chassis-shaped device, and reduce a packet forwarding delay.

In a possible implementation, when the outbound interface of the shortest path is in a congested state, the target outbound interface is an outbound interface in a non-congested state in the outbound interface of the non-shortest path.

In the implementation, when the shortest path is congested, a light-load non-shortest path is preferentially selected for forwarding, to increase a throughput rate.

In a possible implementation, when the outbound interface of the shortest path is in the congested state, and a local outbound interface and an inter-chip outbound interface in the outbound interface of the non-shortest path each are in a non-congested state, the target outbound interface is the local outbound interface in the outbound interface of the non-shortest path, the local outbound interface is an outbound interface of a forwarding chip that receives the first data packet in the first chassis-shaped device, and the inter-chip outbound interface is an outbound interface of another forwarding chip different from the forwarding chip that receives the first data packet in the first chassis-shaped device.

In the implementation, when there are a plurality of outbound interfaces of the non-shortest path, a local outbound interface of a chip is preferentially selected for packet forwarding, to reduce a time period of forwarding a packet in the chassis-shaped device, and reduce a packet forwarding delay.

In a possible implementation, the N forwarding chips include a second forwarding chip, the second forwarding chip includes a second outbound interface, the second outbound interface is configured to be connected to the second chassis-shaped device, and before the selecting a target outbound interface from the M outbound interfaces based on the congested state of each of the M outbound interfaces and a role of each outbound interface, the method further includes: receiving a second notification message from the second forwarding chip, where the second notification message indicates a congested state of the second outbound interface of the second forwarding chip; and recording the congested state of the second outbound interface based on the second notification message.

In the implementation, an intra-chassis inter-chip congestion awareness and notification mechanism is implemented, so that a current congested state of an interconnection link between a local chassis and another chassis can be aware of in a timely manner, and a forwarding path with better comprehensive performance is selected based on the congested state during packet forwarding.

In a possible implementation, the second notification message is generated by the second forwarding chip when a queue depth of the second outbound interface exceeds a depth threshold; or the second notification message is generated by the second forwarding chip when bandwidth utilization of the second outbound interface exceeds a bandwidth utilization threshold.

In the implementation, the forwarding chip may monitor a queue depth or bandwidth utilization of a local interconnection interface, to determine whether the interconnection interface is congested. In this way, implementation complexity is low.

In a possible implementation, the second notification message includes an identifier of the second forwarding chip, an identifier of the second outbound interface, and a congested state identifier.

In a possible implementation, the N forwarding chips include a second forwarding chip, the second forwarding chip includes a second outbound interface, the second outbound interface is configured to be connected to the second chassis-shaped device, and before the selecting a target outbound interface from the M outbound interfaces based on the congested state of each of the M outbound interfaces and a role of each outbound interface, the method further includes: creating a virtual output queue VOQ for the second outbound interface; and determining a congested state of the second outbound interface based on a queue depth of the VOQ.

In the implementation, a current congested state of an outbound interface interconnected to another chassis-shaped device can be aware of based on the queue depth of the VOQ, so that a forwarding path with better comprehensive performance can be selected based on the current congested state of the outbound interface during packet forwarding.

In a possible implementation, the first chassis-shaped device further includes a switching chip, and the switching chip is configured to update the queue depth of the VOQ based on the congested state of the second outbound interface.

In the implementation, the switching chip back presses the congested state of the outbound interface, so that processing overheads caused when a forwarding chip on which the outbound interface is located notifies another forwarding chip of the congested state are reduced when the forwarding chip can be aware of the congested state of the interconnection link.

In a possible implementation, the method further includes: receiving a second data packet from the third chassis-shaped device; obtaining an outbound interface of a shortest path corresponding to the second data packet; and sending the second data packet to the second chassis-shaped device through the outbound interface of the shortest path corresponding to the second data packet.

In the implementation, when the chassis-shaped device is an intermediate chassis, the chassis-shaped device forwards a packet through the shortest path, to avoid a case in which the packet is forwarded from the intermediate chassis to another intermediate chassis through the non-shortest path, thereby effectively avoiding a loop.

According to a second aspect, a packet forwarding apparatus is provided. The packet forwarding apparatus has a function of implementing any one of the first aspect or the optional manners of the first aspect. The packet forwarding apparatus includes at least one unit, and the at least one unit is configured to implement the method according to any one of the first aspect or the optional manners of the first aspect.

In some cases, the unit in the packet forwarding apparatus is implemented by using software, and the unit in the packet forwarding apparatus is a program module. In some other cases, the unit in the packet forwarding apparatus is implemented by using hardware or firmware. For specific details of the packet forwarding apparatus provided in the second aspect, refer to any one of the first aspect or the optional manners of the first aspect. Details are not described herein again.

According to a third aspect, a chassis-shaped device is provided. The chassis-shaped device includes N forwarding chips and at least one primary processing chip, N is greater than or equal to 2, and the chassis-shaped device is configured to perform the method according to any one of the first aspect or the optional manners of the first aspect.

In some cases, the chassis-shaped device includes one or more interface boards, and the N forwarding chips are disposed on different interface boards or a same interface board.

In some cases, the chassis-shaped device further includes a main control board. The main control board is coupled with the interface board. The primary processing chip is disposed on the main control board.

In a possible implementation, an inter-process communication (IPC) channel is established between the main control board and the interface board, and the main control board and the interface board communicate with each other through the IPC channel.

According to a fourth aspect, a computer-readable storage medium is provided. The storage medium stores at least one instruction. When the instruction is run on a computer, the computer is enabled to perform the method according to any one of the first aspect or the optional manners of the first aspect.

According to a fifth aspect, a computer program product is provided. The computer program product includes one or more computer program instructions, and when the computer program instructions are loaded and run by a computer, the computer is enabled to perform the method according to any one of the first aspect or the optional manners of the first aspect.

According to a sixth aspect, a forwarding chip is provided, including a memory, a processor, and one or more network interfaces. The network interface is configured to receive and/or send a data packet, the memory is configured to store computer instructions, and the processor is configured to invoke and run the computer instructions from the memory, to perform a step performed by using the forwarding chip in any one of the first aspect and the possible implementations of the first aspect.

DESCRIPTION OF EMBODIMENTS

To make the objectives, technical solutions, and advantages of this application clearer, the following further describes the implementations of this application in detail with reference to the accompanying drawings.

The following provides example descriptions of a network system architecture provided in embodiments of this application.

Some embodiments of this application are applied to a scenario in which chassis-shaped devices are directly connected and networked in a mesh (mesh) form. A network includes a plurality of chassis-shaped devices, and one or more direct links exist between any two of the plurality of chassis-shaped devices.

Figure 1:
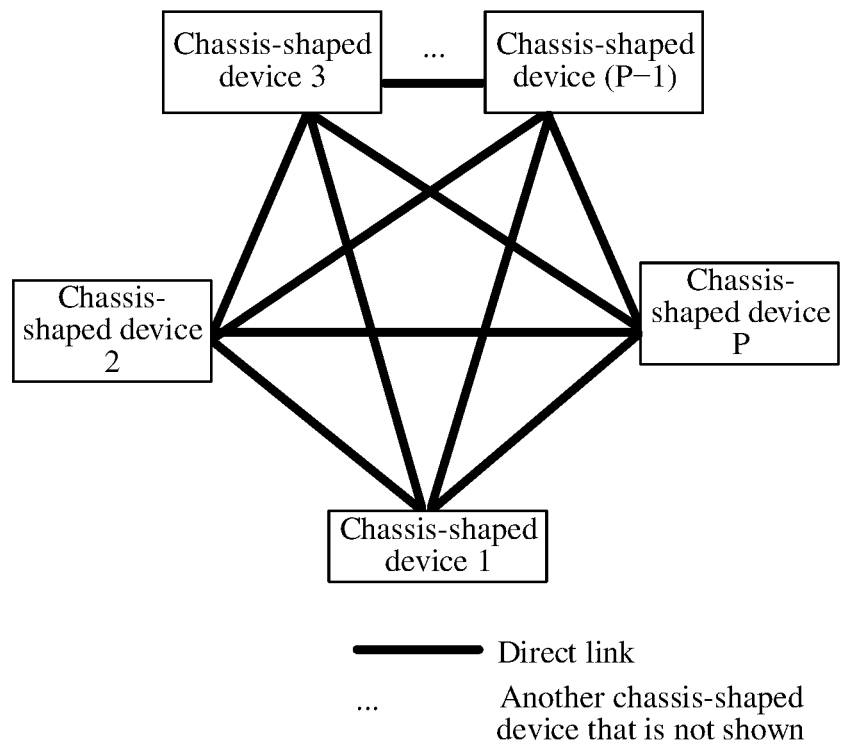
FIG. 1 is a schematic diagram of a networking architecture of a plurality of chassis-shaped devices according to an embodiment of this application.

FIG. 1 shows an architecture in which one direct link exists between any two chassis-shaped devices in a network. As shown in FIG. 1, the network includes P chassis-shaped devices, and each chassis-shaped device is connected to (P−1) other chassis-shaped devices through one direct link, where P is a positive integer greater than or equal to 3. Optionally, for a large-scale networking scenario, the architecture shown in FIG. 1 is used, to form large-scale networking in which chassis-shaped devices are directly connected in a mesh form.

Figure 2:
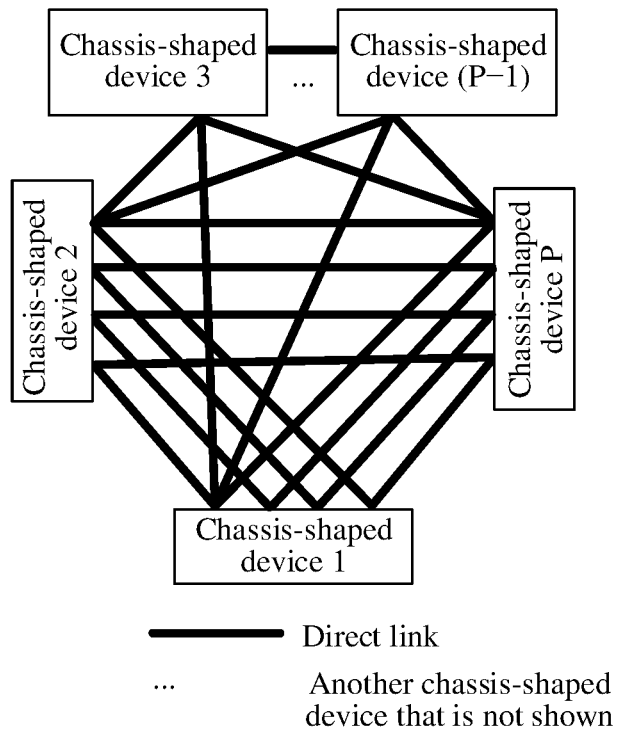
FIG. 2 is a schematic diagram of another networking architecture of a plurality of chassis-shaped devices according to an embodiment of this application.

FIG. 2 shows an architecture in which a plurality of direct links exist between any two chassis-shaped devices in a network. As shown in FIG. 2, the network includes P chassis-shaped devices, and each chassis-shaped device is connected to (P−1) other chassis-shaped devices through a plurality of direct links. Optionally, for a medium/small-scale networking scenario, the architecture shown in FIG. 2 is used, to form medium/small-scale networking in which chassis-shaped devices are directly connected in a mesh form.

Figure 3:
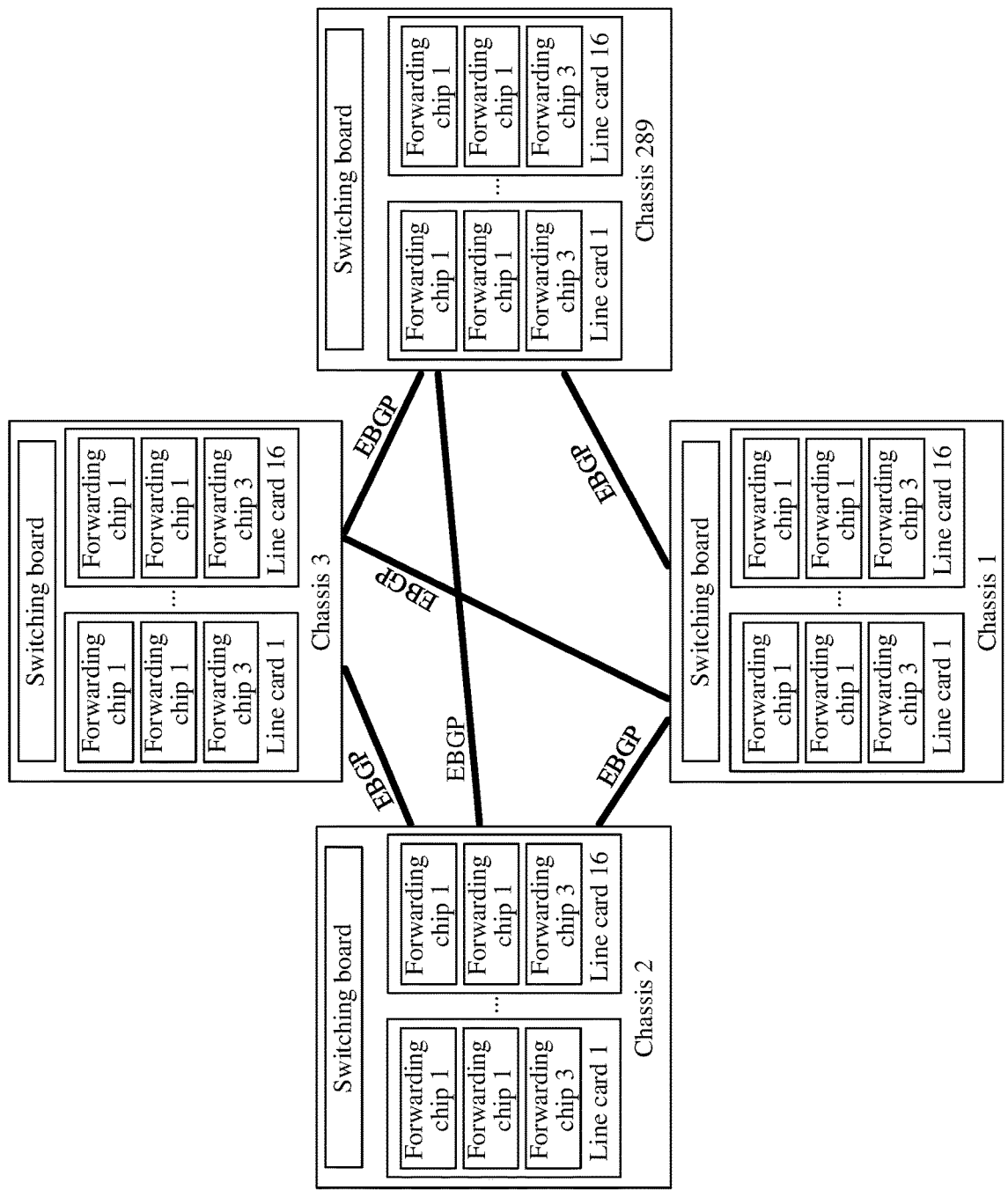
FIG. 3 is a schematic diagram of still another networking architecture of a plurality of chassis-shaped devices according to an embodiment of this application.

For example, as shown in FIG. 3, each chassis-shaped device (briefly referred to as a chassis) includes 16 line cards, and each line card includes three forwarding chips. Each forwarding chip has a bandwidth of 4.8 terabytes (TB, T for short), and each forwarding chip can provide a 12×400 gigabit (G) port to an outside. For example, if a 2.4 T port is used to be connected to a server and a 2.4 T port is used for a direct connection between chassis-shaped devices, each forwarding chip provides six 400 G ports to be connected to the server, and provides six 400 G ports for the direct connection between the chassis-shaped devices. Each chassis-shaped device can be connected to a maximum of 6×3×16=288 other chassis-shaped devices, and 289 chassis-shaped devices can be interconnected in an entire network. Because 289×16×3×6=83232 400 G servers are connected in the entire network, a large networking scale is supported.

For medium/small-scale networking, each pair of chassis-shaped devices are interconnected through a plurality of direct links. For example, if a network system includes nine chassis-shaped devices, and each chassis-shaped device is interconnected to eight other chassis-shaped devices, an average of 288/8=36 interconnection links exist between each pair of chassis-shaped devices. The chassis-shaped device is interconnected, to improve a device integration degree, and reduce network power consumption and networking costs.

The following provides example descriptions of a hardware structure of a chassis-shaped device provided in embodiments of this application.

Figure 4:
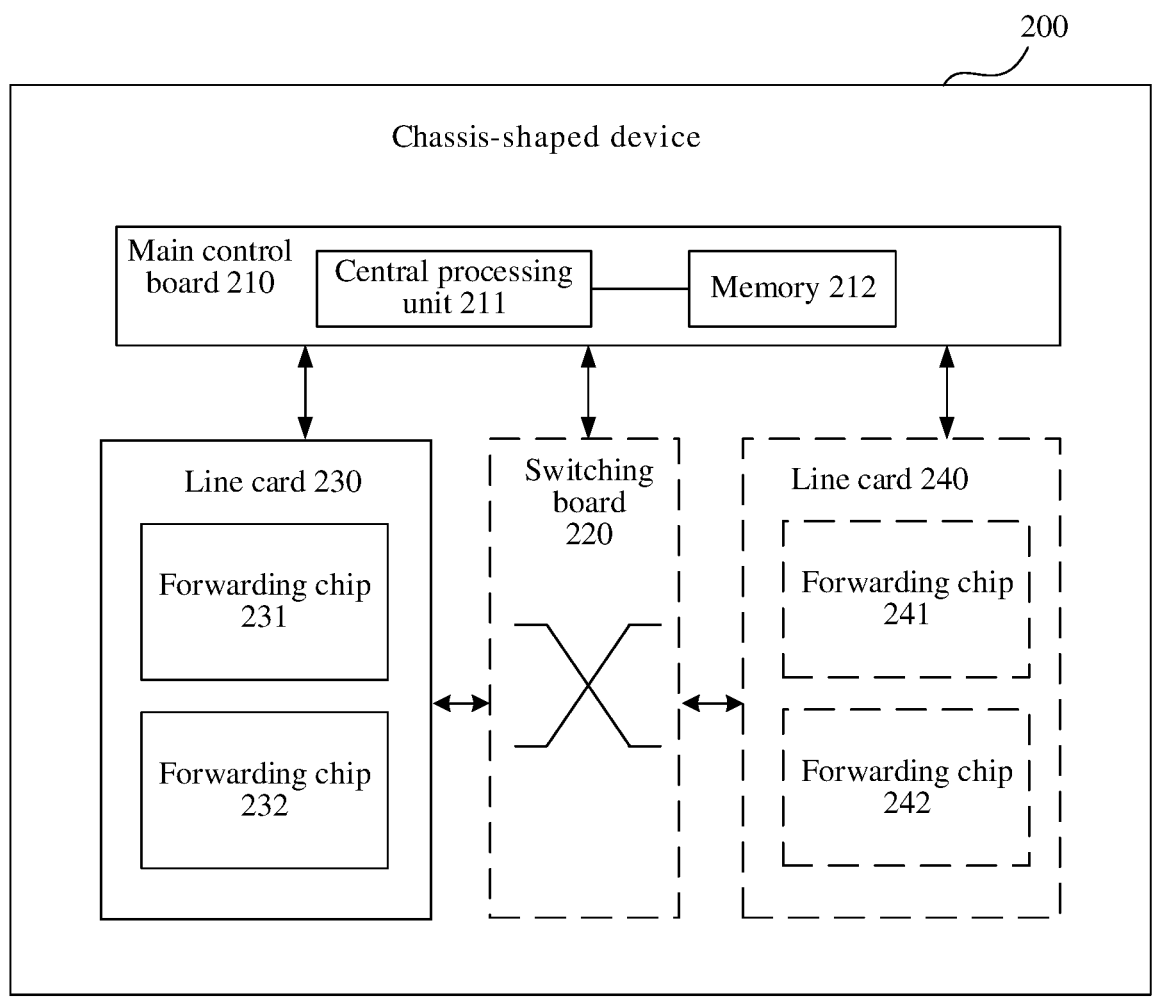
FIG. 4 is a schematic diagram of a structure of a chassis-shaped device according to an embodiment of this application.

FIG. 4 is a schematic diagram of a structure of a chassis-shaped device 200 according to an embodiment of this application. Optionally, each chassis-shaped device in a network system shown in FIG. 1 or FIG. 2 has the structure shown in FIG. 4.

The chassis-shaped device 200 includes a main control board 210 and a line card (line card) 230.

The main control board 210 is also referred to as a main processing unit (MPU) or a route processor card (route processor card). The main control board 210 is configured to control and manage each component in the chassis-shaped device 200, including functions of route calculation, device management, device maintenance, and protocol processing. The main control board 210 includes a central processing unit 211 and a memory 212.

The line card 230 is also referred to as an interface board (interface board), a line processing unit (LPU), or a service board. The line card 230 is configured to: provide various service interfaces and forward a packet. The service interface includes but is not limited to an Ethernet interface, an infiniband (IB) interface, and the like. The Ethernet interface is, for example, a flexible Ethernet service interface (flexible ethernet clients, FlexE clients).

The line card 230 includes a plurality of forwarding chips. In FIG. 4, an example in which the line card 230 includes a forwarding chip 231 and a forwarding chip 232 is used for description.

Optionally, the chassis-shaped device 200 includes a plurality of line cards. For example, the chassis-shaped device 200 further includes a line card 240, and the line card 240 includes a forwarding chip 241 and a forwarding chip 242.

Optionally, the chassis-shaped device 200 further includes a switching board 220. For example, the switching board 220 is also referred to as a switch fabric unit (SFU). When the chassis-shaped device includes a plurality of line cards, the switching board 220 is configured to complete data exchange between the line cards. For example, the line card 230 and the line card 240 communicate with each other, for example, through the switching board 220. When forwarding chips on different line cards need to interact, the switching board 220 is configured to forward data between forwarding chips on different line cards, to implement mutual communication between the forwarding chips.

Optionally, each forwarding chip in the chassis-shaped device 200 is connected to an external device (e.g., a terminal or a server), and is connected to the switching board 220. For example, half of interfaces of each forwarding chip are connected to an external device, and the other half of the interfaces are connected to the switching board.

The main control board 210 is coupled to the line card 230. For example, the main control board 210, the line card 230, the line card 240, and the switching board 220 are connected to a system backplane through a system bus, to implement interworking. In a possible implementation, an inter-process communication (IPC) channel is established between the main control board 210 and the line card 230, and the main control board 210 and the line card 230 communicate with each other through the IPC channel.

Logically, the chassis-shaped device 200 includes a control plane and a forwarding plane. The control plane includes a main control board 210. The main control board 210 includes a central processing unit 211 and a memory 212. The forwarding plane includes each forwarding chip. For example, the forwarding chip 231 and the forwarding chip 232 are disposed on the line card 230, and a switching chip is disposed on the switching board 220. The control plane advertises and learns of a route, generates a forwarding table, processes signaling and a protocol packet, configures and maintains a device status, and the like. The control plane delivers the generated forwarding table to the forwarding plane. The forwarding chip 232 on the forwarding plane searches a table for and forwards, based on the forwarding table delivered by the control plane, a packet received by the network interface (not shown in the figure). The forwarding table delivered by the control plane is stored, for example, in a memory (not shown in the figure) on the line card. In some embodiments, the control plane and the forwarding plane may be deployed on different physical devices.

There may be one or more main control boards. For example, when there are a plurality of main control boards, an active main control board and a standby main control board are included. There may be one or more line cards. A stronger data processing capability of the chassis-shaped device indicates a larger quantity of provided line cards. There may also be one or more physical interface cards on a line card. There may be no switching board or one or more switching boards. When there are a plurality of switching boards, the plurality of switching boards may jointly implement load balancing and backup redundancy. In a centralized forwarding architecture, a chassis-shaped device may not need to include a switching board, and a line card processes service data of an entire system. In a distributed forwarding architecture, a chassis-shaped device may include at least one switching board, to implement data exchange between a plurality of line cards through the switching board, and provides a large-capacity data exchange and processing capability. Therefore, a data access and processing capability of a chassis-shaped device in a distributed architecture is higher than that of a device in a centralized architecture. Optionally, a form of the chassis-shaped device may alternatively include only one card. In other words, there is no switching board, and functions of the line card and main control board are integrated on the card. In this case, a central processing unit on the line card and a central processing unit on the main control board may be combined into one central processing unit on the card, to perform superimposed functions of the two central processing units. A data exchange and processing capability of a device in the form is low (e.g., a chassis-shaped device such as a low-end switch or a low-end router). A specific architecture that is to be used depends on a specific networking deployment scenario. This is not limited herein.

Figure 5:
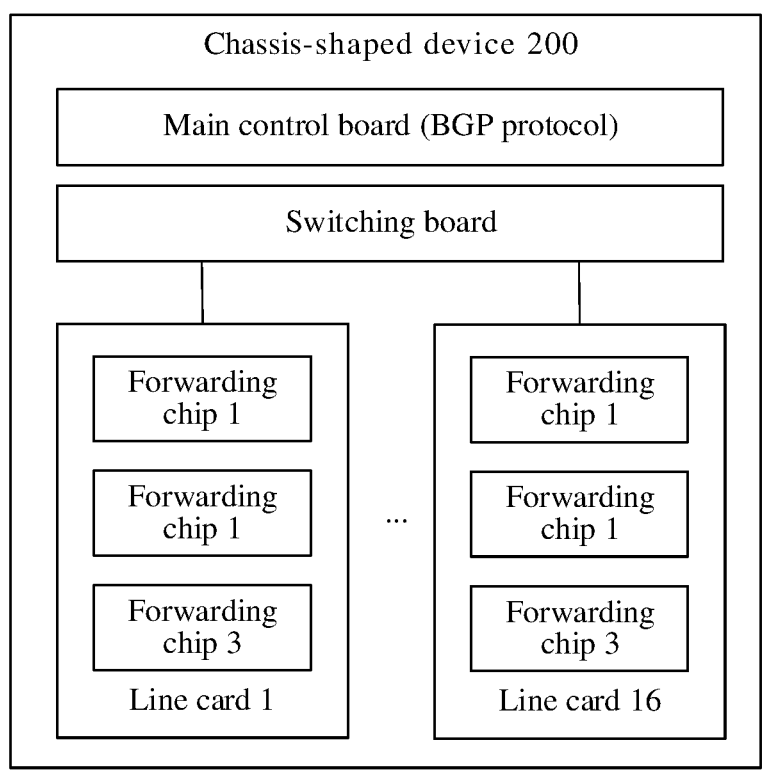
FIG. 5 is a schematic diagram of another structure of a chassis-shaped device according to an embodiment of this application.

In an example embodiment, as shown in FIG. 5, the chassis-shaped device 200 includes 16 line cards, and each line card includes three forwarding chips.

The following provides example descriptions of an implementation environment of a packet forwarding method provided in embodiments of this application.

The packet forwarding method provided in embodiments of this application is applied to a network that includes a plurality of chassis-shaped devices and a plurality of hosts. The plurality of chassis-shaped devices are connected to each other. For a specific connection manner between the plurality of chassis-shaped devices, refer to the architecture shown in FIG. 1, FIG. 2, or FIG. 3. Optionally, each chassis-shaped device has a hardware structure shown in FIG. 4 or FIG. 5. The plurality of chassis-shaped devices are configured to forward a data packet from a source host to a destination host, to support data exchange between different hosts.

The host includes but is not limited to a terminal or a server. The terminal includes but is not limited to a personal computer, a mobile phone, a server, a notebook computer, an IP phone, a camera, a tablet computer, a wearable device, and the like. The server includes but is not limited to an application server or a web server. The application server includes but is not limited to a game server, a video application server, a file server, a search engine server, an instant messaging server, and the like. The web server is also referred to as a world wide web (web) server or a website server.

Figure 6:
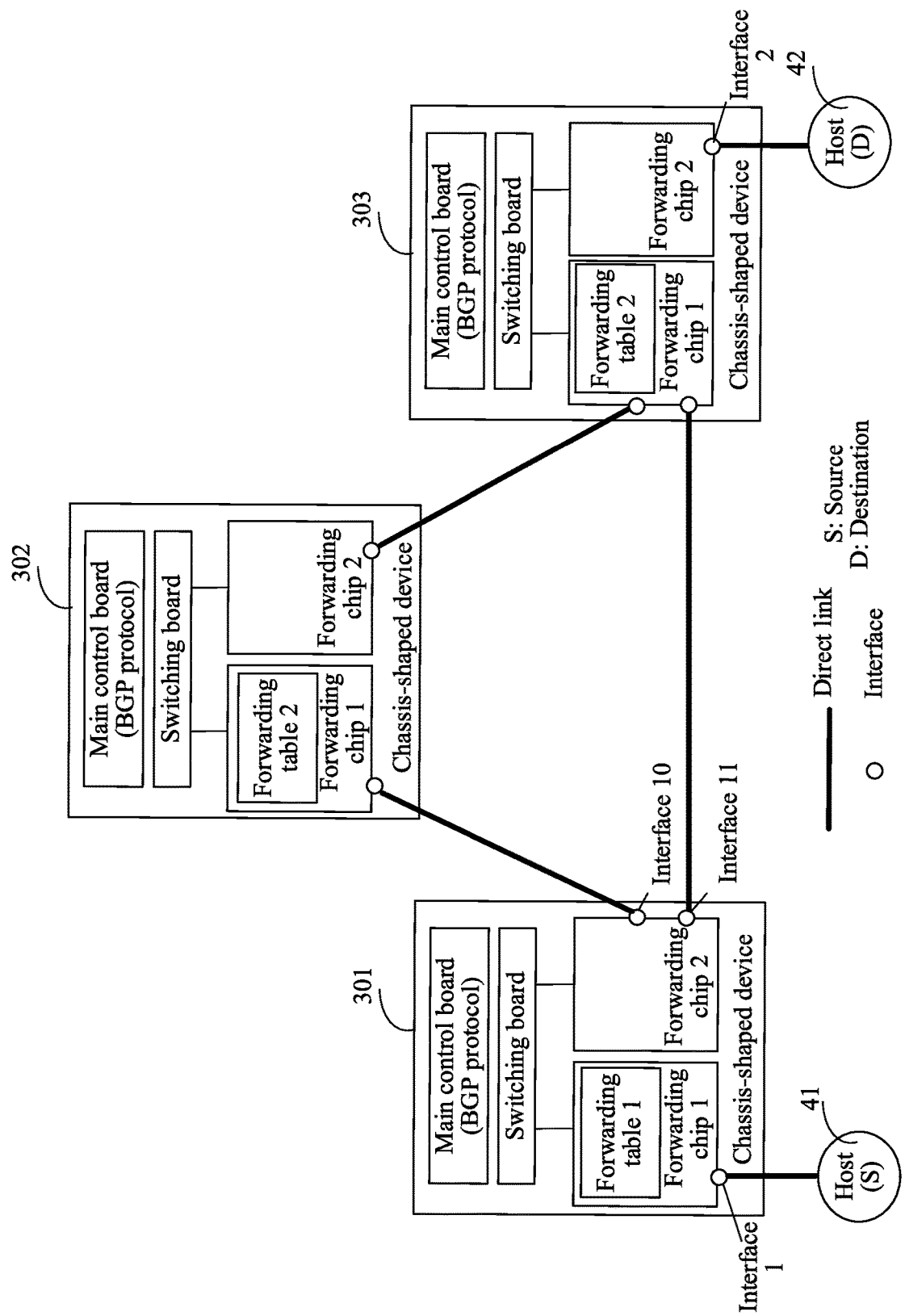
FIG. 6 is a schematic diagram of an implementation environment of a packet forwarding method according to an embodiment of this application.

FIG. 6 is a schematic diagram of an implementation environment according to an embodiment of this application. The implementation environment shown in FIG. 6 includes a host 41, a chassis-shaped device 301, a chassis-shaped device 302, a chassis-shaped device 303, and a host 42. Each chassis-shaped device in FIG. 6 includes but is not limited to a chassis-shaped switch or a chassis-shaped router. Each chassis-shaped device includes a main control board, a switching board, and N forwarding chips (a forwarding chip 1 and a forwarding chip 2 are shown in the figure), where N is greater than or equal to 2.

The chassis-shaped device 301 is connected to the host 41. An interface 1 of a forwarding chip 1 in the chassis-shaped device 301 is connected to the host 41.

The chassis-shaped device 303 is connected to the host 42. An interface 2 of a forwarding chip 2 in the chassis-shaped device 303 is connected to the host 42.

Any two of the chassis-shaped device 301, the chassis-shaped device 302, and the chassis-shaped device 303 are connected through a direct link. A forwarding chip 2 in the chassis-shaped device 301 is connected to a forwarding chip 1 in the chassis-shaped device 302 through a direct link. The forwarding chip 2 in the chassis-shaped device 301 is connected to a forwarding chip 1 in the chassis-shaped device 303 through a direct link. A forwarding chip 2 in the chassis-shaped device 302 is connected to the forwarding chip 1 in the chassis-shaped device 303 through a direct link.

The following provides example descriptions of an application scenario of embodiments of this application.

A typical application scenario of embodiments of this application is high performance computing (HPC). As a branch of scientific computing, HPC usually allocates a complex computing task to different processors for parallel processing, and builds a high performance cluster system by using a common server.

Performance of a high performance computing cluster depends on performance of a computing node and communication efficiency between computing nodes. Computing nodes are usually interconnected through a chassis-shaped device in an HPC network, to improve network device integration efficiency, reduce power consumption, and improve communication efficiency.

Currently, an interconnection topology used for the HPC network is mainly a fat-tree (fat tree) manner, and full mesh (full mesh) networking is performed by using two tiers of switches, namely, spine and leaf (spine-leaf) switches or more tiers of switches. However, when networking is performed in a three-level fat-tree manner, a shortest path needs to pass through at least five hops of nodes, and the five hops of nodes are a source leaf (leaf) switch, a spine (spine) switch, a super spine switch, a spine (spine) switch, and a destination leaf switch. Consequently, a delay is large, and networking costs are high.

The network system architecture provided in embodiments of this application is applied to the HPC network. Because a topology in which chassis-shaped devices are directly connected is used, a shortest path only needs to pass through two hops of nodes (that is, a source chassis-shaped device and a destination chassis-shaped device) when any two chassis-shaped devices communicate with each other, unlike a fat tree in which the shortest path still needs to pass through five hops of nodes. Therefore, a quantity of hops on a shortest path for inter-chassis forwarding is reduced, and a delay can be lower than that in fat-tree networking. In addition, networking costs can be lower than those in the fat tree.

The following provides example descriptions of a procedure of a packet forwarding method provided in embodiments of this application. The packet forwarding method provided in embodiments of this application is used to support a chassis-shaped device to perform adaptive routing. During packet forwarding, a forwarding chip performs adaptive routing based on a congested state of an outbound interface. Adaptive routing means that a congestion situation of a packet forwarding path is considered, and a shortest path is preferentially used for packet forwarding, to ensure a low delay; and when the shortest path starts to be congested, a non-shortest path is used to packet forwarding, to increase a throughput rate.

Figure 7:
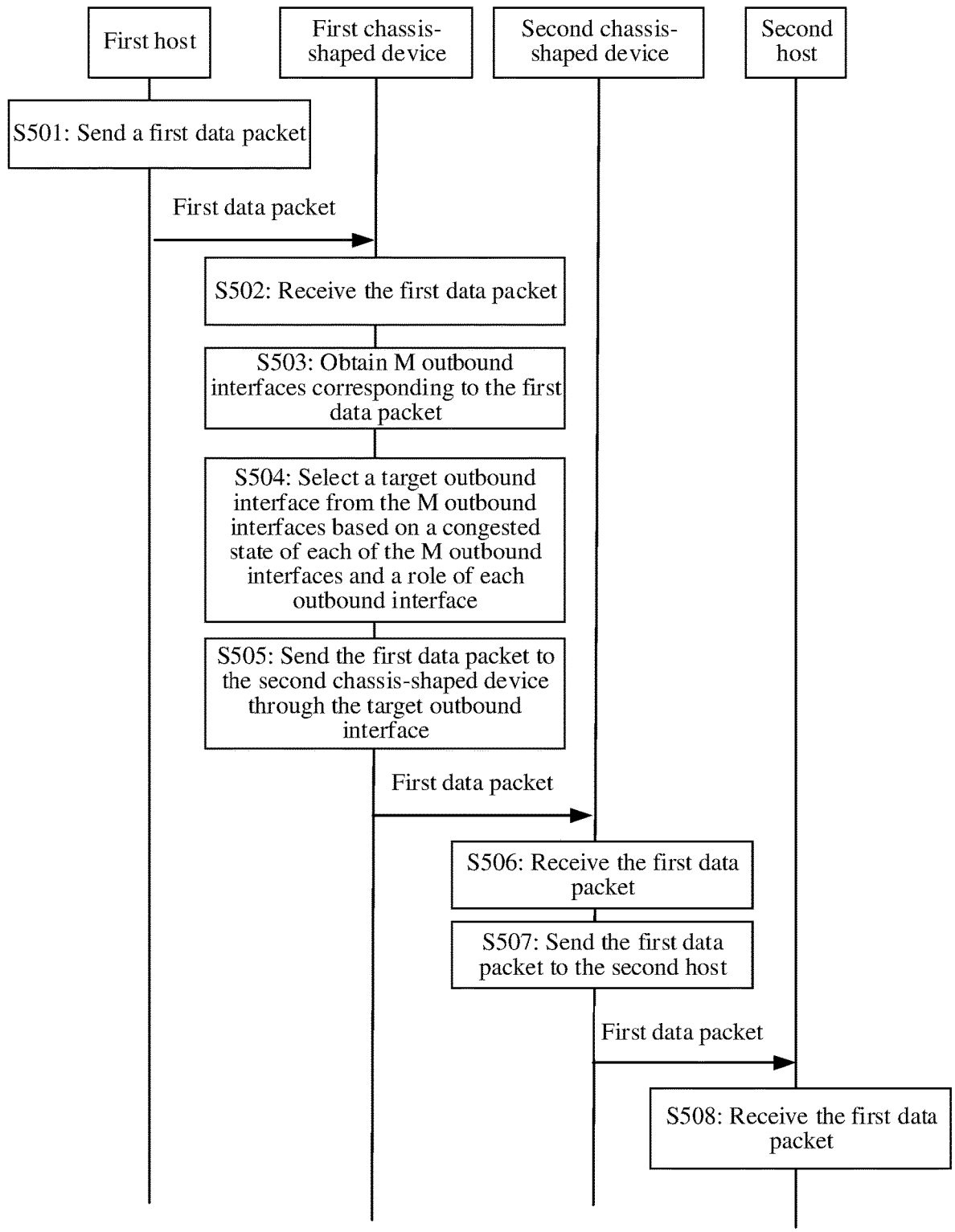
FIG. 7 is a flowchart of a packet forwarding method according to an embodiment of this application.

FIG. 7 is a flowchart of a packet forwarding method according to an embodiment of this application.

In the method shown in FIG. 7, a plurality of hosts interact. To distinguish different hosts, "first host" and "second host" are used to distinguish and describe a plurality of different hosts. The method shown in FIG. 7 is described by using an example in which a data packet generated by the first host is forwarded to the second host. In a process of forwarding the data packet, the first host is a source device of the data packet, and the second host is a destination device of the data packet.

In the method shown in FIG. 7, a plurality of chassis-shaped devices interact. To distinguish different chassis-shaped devices, "first chassis-shaped device", "second chassis-shaped device", and "third chassis-shaped device" are used to distinguish different chassis-shaped devices. The method shown in FIG. 7 is described by using, as an example, a scenario in which a first host is connected to the first chassis-shaped device and the second host is connected to the second chassis-shaped device. In the process of forwarding the data packet, the first chassis-shaped device is responsible for receiving the data packet from the first host, and forwarding the data packet to the second chassis-shaped device. The second chassis-shaped device is responsible for forwarding, to the second host, a data packet whose destination is the second host. A third chassis-shaped device is an optional node, the third chassis-shaped device is an intermediate node between the first chassis-shaped device and the second chassis-shaped device, and the third chassis-shaped device is configured to forward a packet between the first chassis-shaped device and the second chassis-shaped device.

Optionally, a network system architecture on which the method shown in FIG. 7 is based is shown in FIG. 6. With reference to FIG. 6, the first host in the method shown in FIG. 7 is the host 41 in FIG. 6, the first chassis-shaped device in the method shown in FIG. 7 is the chassis-shaped device 301 in FIG. 6, the second chassis-shaped device in the method shown in FIG. 7 is the chassis-shaped device 303 in FIG. 6, the third chassis-shaped device in the method shown in FIG. 7 is the chassis-shaped device 302 in FIG. 6, and the second host in the method shown in FIG. 7 is the host 42 in FIG. 6.

Optionally, the method shown in FIG. 7 is applied to a scenario of forwarding a plurality of data packets from the first host. For ease of understanding of a reader, the method shown in FIG. 7 is described by using, as an example, a procedure of forwarding one data packet (that is, a first data packet) from the first host. For a manner of forwarding another data packet from the first host, refer to a manner of forwarding the first data packet.

The method shown in FIG. 7 includes S501 to S508.

S501: The first host sends the first data packet.

A source Internet protocol (IP) address of the first data packet is an IP address of the first host, and a destination IP address of the first data packet is an IP address of the second host.

S502: The first chassis-shaped device receives the first data packet from the first host.

S503: The first chassis-shaped device obtains M outbound interfaces corresponding to the first data packet.

The M outbound interfaces are outbound interfaces corresponding to the first data packet in outbound interfaces of N forwarding chips of the first chassis-shaped device. Herein, M is a positive integer. Optionally, M is greater than or equal to 2. The following describes possible features of the M outbound interfaces.

In some embodiments, the M outbound interfaces are outbound interfaces corresponding to the destination IP address of the first data packet. The first chassis-shaped device stores a forwarding table. The forwarding table indicates a correspondence between a destination IP address and an outbound interface. Each of the M outbound interfaces is an outbound interface corresponding to the destination IP address of the first data packet in the forwarding table of the first chassis-shaped device.

In some embodiments, the M outbound interfaces belong to a same equal-cost multi-path (ECMP) group. Each of the M outbound interfaces is also referred to as a member interface in the ECMP group.

In some embodiments, the M outbound interfaces include at least one of an outbound interface of a shortest path and an outbound interface of a non-shortest path. For example, there are K paths between the first chassis-shaped device and the second chassis-shaped device, the shortest path is a shortest path in the K paths between the first chassis-shaped device and the second chassis-shaped device, and the non-shortest path is a path other than the shortest path in the K paths between the first chassis-shaped device and the second chassis-shaped device. Herein, K is a positive integer greater than or equal to 2.

There are a plurality of possible cases of the shortest path and the non-shortest path. The following provides example descriptions of some possible cases of the shortest path and the non-shortest path.

Optionally, the shortest path is a direct link between the first chassis-shaped device and the second chassis-shaped device, and the non-shortest path is a path passing through one or more intermediate nodes between the first chassis-shaped device and the second chassis-shaped device.

The direct connection includes but is not limited to a physical direct connection or a logical direct connection. For example, the physical direct connection means that the first chassis-shaped device is connected to the second chassis-shaped device through an optical fiber, a coaxial cable, or a digital subscriber line (digital subscriber line, DSL), or in another wired manner. For example, the logical direct connection means that the first chassis-shaped device and the second chassis-shaped device are reachable in one hop. In other words, the second chassis-shaped device is a next hop node (next hop) of the first chassis-shaped device in an IP network. When the logical direct connection is used, one or more layer 2 network devices (e.g., a layer 2 switch) optionally exist between the first chassis-shaped device and the second chassis-shaped device.

Optionally, the intermediate node is a chassis-shaped device. For example, the third chassis-shaped device is an intermediate node between the first chassis-shaped device and the second chassis-shaped device, and the non-shortest path is a path connecting the first chassis-shaped device and the second chassis-shaped device through the third chassis-shaped device. Optionally, the third chassis-shaped device is directly connected to the first chassis-shaped device, the third chassis-shaped device is directly connected to the second chassis-shaped device, and the non-shortest path includes a direct link between the first chassis-shaped device and the third chassis-shaped device, and a direct link between the third chassis-shaped device and the second chassis-shaped device.

Alternatively, the intermediate node is a layer 3 network device other than the chassis-shaped device.

Alternatively, the shortest path is a path whose hop count is less than or equal to a hop count threshold, and the non-shortest path is a path whose hop count is greater than the hop count threshold. For example, a path passing through one hop of intermediate node is defined as the shortest path, and a path passing through a plurality of hops of intermediate nodes is defined as the non-shortest path.

Alternatively, the shortest path is a path whose costs (cost) are less than or equal to a cost threshold, and the non-shortest path is a path whose costs are greater than the cost threshold.

The described possible cases of the shortest path and the non-shortest path are all examples for description, and the shortest path and the non-shortest path are not limited in this embodiment.

In some embodiments, each of the M outbound interfaces is a global (global) port. The outbound interfaces of the N forwarding chips include a global port and an access (access) port. The global port is a port for an interconnection between chassis-shaped devices, in other words, a port that is on the first chassis-shaped device and that is used for an interconnection with another chassis-shaped device different from the first chassis-shaped device. The access port is a port for connecting the first chassis-shaped device and a host.

In some embodiments, the M outbound interfaces are outbound interfaces of a same forwarding chip in the N forwarding chips. In some other embodiments, the M outbound interfaces include outbound interfaces of different forwarding chips in the N forwarding chips.

In some embodiments, the M outbound interfaces include at least one of a local outbound interface and an inter-chip outbound interface.

The local outbound interface is also referred to as an intra-chip outbound interface, and the local outbound interface is an outbound interface of a forwarding chip that receives the first data packet in the first chassis-shaped device. The inter-chip outbound interface is an outbound interface of another forwarding chip different from the forwarding chip that receives the first data packet in the first chassis-shaped device. For example, if the first data packet is received by a forwarding chip A in the N forwarding chips, each outbound interface of the forwarding chip A is a local outbound interface, and an outbound interface of another forwarding chip different from the forwarding chip A in the N forwarding chips is an inter-chip outbound interface.

Optionally, each of the M outbound interfaces is a local outbound interface; or each of the M outbound interfaces is an inter-chip outbound interface; or some of the M outbound interfaces are local outbound interfaces, and the other outbound interfaces are inter-chip outbound interfaces.

Optionally, the described various features of the M outbound interfaces may be combined with each other or exist independently. For example, the M outbound interfaces include zero, one, or more outbound interfaces of the shortest path and zero, one, or more outbound interfaces of the non-shortest path. The outbound interface of the shortest path includes zero, one, or more local outbound interfaces and zero, one, or more inter-chip outbound interfaces, and the outbound interface of the non-shortest path includes zero, one, or more local outbound interfaces and zero, one, or more inter-chip outbound interfaces.

In some embodiments, a process in which the first chassis-shaped device obtains the M outbound interfaces specifically includes: The first chassis-shaped device parses the first data packet, to obtain the destination IP address of the first data packet. The first chassis-shaped device searches, based on the destination IP address of the first data packet, a forwarding table stored in the first chassis-shaped device for a route prefix that matches the destination IP address of the first data packet, to obtain M outbound interfaces corresponding to the route prefix.

Optionally, the forwarding table includes a first forwarding table and a second forwarding table. The first forwarding table is used to perform forwarding through adaptive routing, and the second forwarding table is used to perform forwarding through the shortest path. An outbound interface corresponding to each IP address in the first forwarding table includes the outbound interface of the shortest path and the outbound interface of the non-shortest path, so that an outbound interface is selected, for packet forwarding, from the outbound interface of the shortest path and the outbound interface of the non-shortest path based on a current congested state of the outbound interface, to implement flexible switching between the shortest path and the non-shortest path. An outbound interface corresponding to each IP address in the second forwarding table is the outbound interface of the shortest path, so that a packet is always forwarded through the shortest path.

Optionally, when the first chassis-shaped device is a source chassis of a data packet, the first forwarding table is used, and when the first chassis-shaped device is a destination chassis or an intermediate chassis of a data packet, the second forwarding table is used. In some embodiments, the first chassis-shaped device determines, based on an inbound interface of the data packet, whether to query the first forwarding table or the second forwarding table. For example, after the first chassis-shaped device receives a data packet (e.g., the first data packet) through an interface a, the first chassis-shaped device determines whether the interface a is a global port or an access port. If the interface a is an access port, it indicates that the data packet is received from the host, and the first chassis-shaped device is a source chassis of the data packet. In this case, the first chassis-shaped device queries the first forwarding table, to obtain M outbound interfaces. The M outbound interfaces include the outbound interface of the shortest path and the outbound interface of the non-shortest path. If the interface a is a global port, it indicates that the data packet is received from another chassis-shaped device, and the first chassis-shaped device is an intermediate chassis or a destination chassis of the data packet. In this case, the first chassis-shaped device queries the second forwarding table, to obtain M outbound interfaces. The M outbound interfaces include the outbound interface of the shortest path.

Optionally, the forwarding table includes a target board identifier (TB ID) of a forwarding chip to which an outbound interface belongs and a target port identifier (TP ID) of the outbound interface. The TB ID is a unique number of each forwarding chip in the first chassis-shaped device, and the TP ID is a unique number of each outbound interface of the first chassis-shaped device in a forwarding chip to which the outbound interface belongs. After a forwarding chip finds M outbound interfaces from the forwarding table, for each of the M outbound interfaces, the forwarding chip optionally determines, based on whether a TB ID of the outbound interface is the same as a TB ID of the chip, whether the outbound interface is a local outbound interface or an inter-chip outbound interface. If the TB ID of the outbound interface is the same as the TB ID of the chip, the forwarding chip determines that the outbound interface is a local outbound interface. If the TB ID of the outbound interface is different from the TB ID of the chip, the forwarding chip determines that the outbound interface is an inter-chip outbound interface.

S504: The first chassis-shaped device selects a target outbound interface from the M outbound interfaces based on a congested state of each of the M outbound interfaces and a role of each outbound interface.

There are a plurality of implementations of determining a congested state of an outbound interface. The following provides example descriptions of some possible implementations of determining the congested state.

In some embodiments, the first chassis-shaped device determines the congested state of the outbound interface based on at least one of a queue depth, bandwidth utilization, a buffer (buffer) length, and a remaining bandwidth of the outbound interface.

For example, the congested state is determined based on the queue depth. For example, the first chassis-shaped device obtains a queue depth of each of the M outbound interfaces. The first chassis-shaped device compares the queue depth of each outbound interface with a depth threshold. If a queue depth of an outbound interface exceeds the depth threshold, the first chassis-shaped device determines that the outbound interface is in a congested state. If a queue depth of an outbound interface is less than or equal to the depth threshold, the first chassis-shaped device determines that the outbound interface is in a non-congested state. Optionally, the congested state further includes a moderately congested state and a heavily congested state. Different depth thresholds are used to determine whether the congested state is a moderately congested state or a heavily congested state. For example, the depth threshold includes a first depth threshold and a second depth threshold, and the first depth threshold is greater than the second depth threshold. If a queue depth of an outbound interface exceeds the first depth threshold, the first chassis-shaped device determines that the outbound interface is in a heavily congested state. If a queue depth of an outbound interface does not exceed the first depth threshold but exceeds the second depth threshold, the first chassis-shaped device determines that the outbound interface is in a moderately congested state.

For example, the congested state is determined based on the bandwidth utilization. For example, the first chassis-shaped device obtains bandwidth utilization of each of the M outbound interfaces. The first chassis-shaped device compares the bandwidth utilization of each outbound interface with a bandwidth utilization threshold. If bandwidth utilization of an outbound interface exceeds the bandwidth utilization threshold, the first chassis-shaped device determines that the outbound interface is in a congested state.

For example, the congested state is determined based on the buffer length. For example, the first chassis-shaped device obtains a buffer length of each of the M outbound interfaces. The first chassis-shaped device compares the buffer length of each outbound interface with a length threshold. If a buffer length of an outbound interface exceeds the length threshold, the first chassis-shaped device determines that the outbound interface is in a congested state.

For example, the congested state is determined based on the remaining bandwidth. For example, the first chassis-shaped device obtains a remaining bandwidth of each of the M outbound interfaces. The first chassis-shaped device compares the remaining bandwidth of each outbound interface with a bandwidth threshold. If a remaining bandwidth of an outbound interface is less than the bandwidth threshold, the first chassis-shaped device determines that the outbound interface is in a congested state.

Optionally, the described various implementations of determining the congested state of the outbound interface may be combined with each other or exist independently. For example, the first chassis-shaped device determines the congested state of the outbound interface based on the queue depth and the bandwidth utilization of the outbound interface. If a queue depth of an outbound interface exceeds the depth threshold and bandwidth utilization exceeds the bandwidth utilization threshold, the first chassis-shaped device determines that the outbound interface is in a congested state.

Optionally, the process of determining the congested state of the outbound interface is performed by an uplink chip in the N forwarding chips. The N forwarding chips include the uplink chip and a downlink chip. The uplink chip is a forwarding chip located in an uplink direction of a switching chip. The uplink chip includes an outbound interface connected to the first host. The downlink chip is a forwarding chip located in a downlink direction of the switching chip. The downlink chip includes an outbound interface connected to the second chassis-shaped device. In a process of forwarding the first data packet, the uplink chip receives the first data packet from the first host, and forwards the first data packet to the switching chip; the switching chip receives the first data packet from the uplink chip, and forwards the first data packet to the downlink chip; and the downlink chip receives the first data packet from the switching chip, and forwards the first data packet to the second chassis-shaped device.

Optionally, when the M outbound interfaces include an inter-chip outbound interface, an inter-chip congestion awareness mechanism is further provided in this embodiment, to help the forwarding chip be aware of a congested state of an outbound interface of an intra-chassis another forwarding chip. In this way, a forwarding path with better comprehensive performance is selected based on the congested state of the outbound interface. The inter-chip congestion awareness mechanism includes but is not limited to Manner 1 and Manner 2.

Manner 1: The forwarding chip sends a notification message to another forwarding chip, to notify the congested state of the outbound interface.

For a forwarding chip i in the N forwarding chips, the forwarding chip i determines a congested state of each outbound interface of the chip, and the forwarding chip i generates a congestion notification message based on the congested state of each outbound interface, and sends the congestion notification message to (N−1) other forwarding chips different from the forwarding chip i in the N forwarding chips. Each of the (N−1) other forwarding chips receives the congestion notification message of the forwarding chip i, and records the congested state of each outbound interface of the forwarding chip i based on the congestion notification message of the forwarding chip i.

The congestion notification message indicates the congested state of the outbound interface of the forwarding chip i. The congestion notification message includes at least one of an identifier of the forwarding chip i, an identifier of the outbound interface of the forwarding chip i, a congested state identifier, and a message type.

The identifier of the forwarding chip i identifies the forwarding chip i. Optionally, the identifier of the forwarding chip i is a TB ID of the forwarding chip i.

The identifier of the outbound interface identifies a corresponding outbound interface in a plurality of outbound interfaces of the forwarding chip i. Optionally, the identifier of the outbound interface is a TP ID.

The congested state identifier indicates whether the outbound interface is in a congested state. Optionally, the congested state identifier occupies a plurality of bits in the congestion notification message, and the plurality of bits identify a plurality of congested states. The plurality of congested states include but are not limited to light load, moderate congestion, and heavy congestion. The light load is a non-congested state, and the moderate congestion and the heavy congestion are congested states. For example, the congested state identifier occupies 2 bits. When a value of the 2 bits is 00, the 2 bits identify the light load; or when a value of the 2 bits is 01, the 2 bits identify the moderate congestion; or when a value of the 2 bits is 10, the 2 bits identify the heavy congestion. Alternatively, the congested state identifier occupies 1 bit in the congestion notification message, and the 1 bit identifies whether the outbound interface is in the congested state. For example, when a value of the 1 bit is 0, the 1 bit identifies the non-congested state; or when a value of the 1 bit is 1, the 1 bit identifies the congested state.

The message type identifies that a type of the message is a congestion notification message.

Optionally, the congestion notification message is a multicast message. For example, a multicast source corresponding to the congestion notification message generated by the forwarding chip i is the forwarding chip i, and a multicast group is the (N−1) other forwarding chips different from the forwarding chip i in the N forwarding chips.

Optionally, the congestion notification message is a unicast message. For example, the forwarding chip i generates (N−1) congestion notification messages for the (N−1) other forwarding chips different from the forwarding chip i, and the forwarding chip i sends one congestion notification message to each of the (N−1) other forwarding chips.

Optionally, a switching board forwards the congestion notification message between different forwarding chips. For example, when the congestion notification message is a multicast message, the switching board stores a multicast forwarding entry, and an outbound interface list in the multicast forwarding entry is an interface that is on the switching board and that is used to be connected to each of the N forwarding chips.

The following describes, by using a process of determining a congested state of a second outbound interface of a second forwarding chip as an example, how to determine the congested state of the outbound interface in Manner 1. The second forwarding chip is the forwarding chip i in the N forwarding chips.

For example, the second forwarding chip includes the second outbound interface. The second outbound interface is configured to be connected to the second chassis-shaped device. The second outbound interface is a global port. The second forwarding chip obtains the congested state of the second outbound interface. The second forwarding chip generates a second notification message based on the congested state of the second outbound interface. The second forwarding chip sends the second notification message to another forwarding chip different from the second forwarding chip in the N forwarding chips. The another forwarding chip different from the second forwarding chip in the N forwarding chips receives the second notification message, and records the congested state of the second outbound interface based on the second notification message.

The second notification message indicates the congested state of the second outbound interface of the second forwarding chip.

Optionally, the second notification message is the congestion notification message.

Optionally, the second notification message includes an identifier of the second forwarding chip, an identifier of the second outbound interface, and the congested state identifier.

Optionally, the second notification message is generated by the second forwarding chip when a queue depth of the second outbound interface exceeds the depth threshold; or the second notification message is generated by the second forwarding chip when bandwidth utilization of the second outbound interface exceeds the bandwidth utilization threshold.

Manner 2: The uplink chip is aware of a congested state of an outbound interface of the downlink chip through a virtual output queue (VOQ).

The uplink chip establishes a corresponding VOQ for each outbound interface of each downlink chip. The VOQ is configured to buffer a data packet that is received from the first host and that is to be sent to the switching chip. For example, for an $i^{th}$ outbound interface in the M outbound interfaces, the uplink chip establishes a VOQi. During packet forwarding, the uplink chip determines a congested state of the $i^{th}$ outbound interface based on a queue depth of the VOQi. In a possible implementation, if the queue depth of the VOQi exceeds a queue depth threshold, the uplink chip determines that the i$^{th}$ outbound interface is in a congested state.

Optionally, the switching chip back presses the congested state of the outbound interface to the uplink chip. The switching chip obtains a congested state of each outbound interface of the downlink chip, and updates a queue depth of the VOQ based on the congested state of the outbound interface.

The following describes, by using a process of determining a congested state of a second outbound interface of a second forwarding chip as an example, how to be aware of the congested state of the outbound interface of the downlink chip in Manner 2.

For example, the N forwarding chips include the second forwarding chip. The second forwarding chip is a downlink chip. The second forwarding chip includes the second outbound interface. The second outbound interface is configured to be connected to the second chassis-shaped device. The second outbound interface is a global port. The uplink chip establishes a virtual output queue VOQ for the second outbound interface; and determines the congested state of the second outbound interface based on a queue depth of the VOQ. Optionally, the switching chip updates the queue depth of the VOQ based on the congested state of the second outbound interface.

In Manner 1 or Manner 2, an intra-chassis-shaped device inter-chip congestion awareness and notification mechanism is introduced, and a plurality of forwarding chips perform cooperative processing, so that a chip can select a forwarding path with better comprehensive performance based on a congestion situation of the outbound interface during forwarding.

The role of the outbound interface includes the outbound interface of the shortest path between the first chassis-shaped device and the second chassis-shaped device and the outbound interface of the non-shortest path between the first chassis-shaped device and the second chassis-shaped device.

Optionally, the first chassis-shaped device searches the forwarding table, to determine the role of each outbound interface. The first forwarding table includes one or more correspondences between a route prefix, an ECMP group, and a role of an outbound interface in the ECMP group. The role of the outbound interface in the ECMP group in the first forwarding table includes the outbound interface of the shortest path and the outbound interface of the non-shortest path. For example, an entry corresponding to the first data packet in the first forwarding table is a first forwarding entry. The first chassis-shaped device determines the role of each of the M outbound interfaces based on the destination IP address of the first data packet and the first forwarding entry. The first forwarding entry includes the correspondence among a route prefix, an ECMP group, and a role of an outbound interface in the ECMP group, the route prefix includes a prefix of the destination IP address of the first data packet, and the ECMP group includes the M outbound interfaces.

Figure 8:
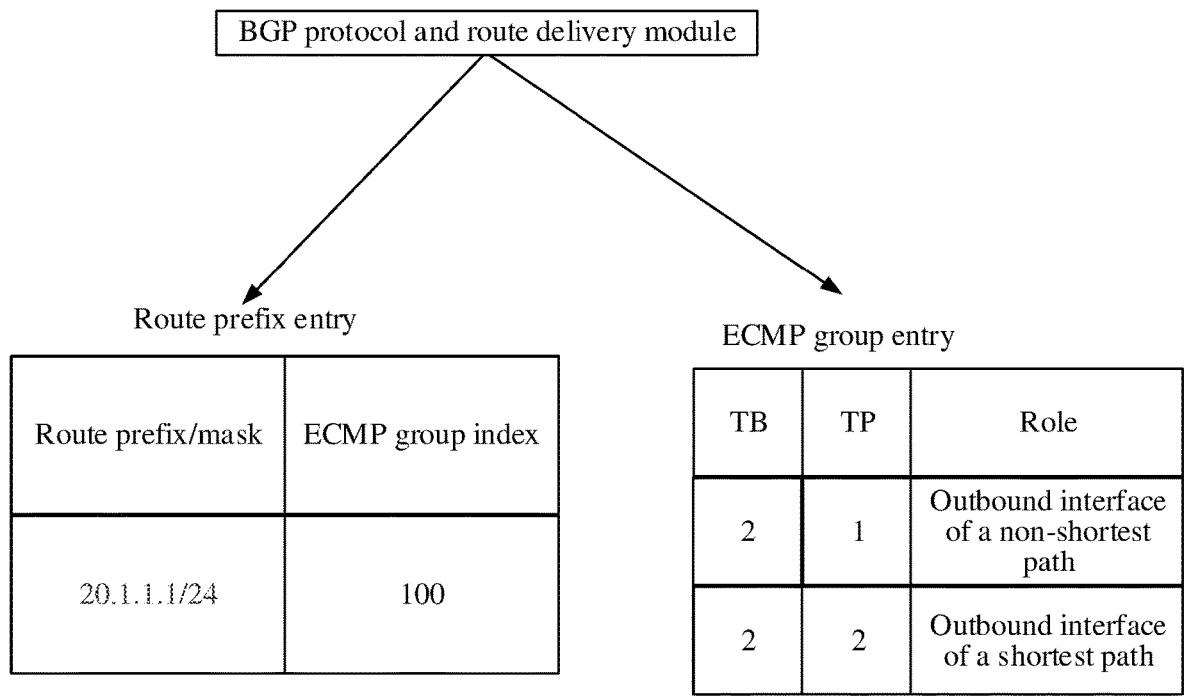
FIG. 8 is a schematic diagram of delivering a forwarding entry according to an embodiment of this application.

FIG. 8 is a schematic diagram of delivering a forwarding entry according to an embodiment of this application. The first forwarding entry includes a route prefix entry and an ECMP group entry in FIG. 8. The first forwarding entry is generated by a BGP protocol and route delivery module in FIG. 8. Optionally, the BGP protocol and route delivery module in FIG. 8 are software functional modules that run on the central processing unit 211 on the main control board 210 of the chassis-shaped device 200 shown in FIG. 4. The route prefix entry and the ECMP group entry in FIG. 8 are forwarding entries that are stored in the memory and that are on the forwarding chip 231 of the chassis-shaped device 200 shown in FIG. 4. The route prefix entry shown in FIG. 8 includes a route prefix/mask and an ECMP group index (the index may be an ECMP ID). The ECMP group entry includes a TB ID, a TP ID, and a role of an outbound interface in an ECMP group corresponding to a group ID 100. With reference to the forwarding entry shown in FIG. 8, the following describes how to determine the role of each of the M outbound interfaces.

For example, after receiving the first data packet, the first chassis-shaped device searches, based on the destination IP address of the first data packet, the forwarding table for a forwarding entry that matches the destination IP address of the first data packet. If the first chassis-shaped device finds that the destination IP address of the first data packet matches 20.1.1.1/24, the first chassis-shaped device obtains the group ID 100 from a forwarding entry corresponding to 20.1.1.1/24. The first chassis-shaped device obtains a corresponding ECMP group, each outbound interface in the ECMP group, and a role of each outbound interface based on the group ID 100, to obtain two outbound interfaces. A TB ID of one outbound interface is 2, a TP ID is 1, and a role is the outbound interface of the non-shortest path. A TB ID of the other outbound interface is 1, a TP ID is 1, and a role is the outbound interface of the shortest path. The role of the outbound interface may be represented by different values or character strings. For example, "0" indicates the outbound interface of the shortest path, and "1" indicates the outbound interface of the non-shortest path.

The target outbound interface is an outbound interface used to forward the first data packet in the M outbound interfaces. There are a plurality of implementations of selecting the target outbound interface. The following provides example descriptions of some possible implementations.

In some embodiments, the first chassis-shaped device preferentially selects an outbound interface corresponding to a light-load shortest path. The first chassis-shaped device determines whether the outbound interface of the shortest path in the M outbound interfaces is in a congested state or a non-congested state. When the outbound interface of the shortest path in the M outbound interfaces is in the non-congested state, the first chassis-shaped device selects the outbound interface of the shortest path in the M outbound interfaces as the target outbound interface.

In some embodiments, if the shortest path is congested, the first chassis-shaped device preferentially selects an outbound interface corresponding to a light-load non-shortest path. For example, the first chassis-shaped device determines whether the outbound interface of the shortest path in the M outbound interfaces is in a congested state or a non-congested state. When the outbound interface of the shortest path in the M outbound interfaces is in the congested state, the first chassis-shaped device selects an outbound interface in a non-congested state from the outbound interface of the non-shortest path in the M outbound interfaces as the target outbound interface.

In some embodiments, the first chassis-shaped device preferentially selects the local outbound interface from the local outbound interface and the inter-chip outbound interface, and then selects the inter-chip outbound interface when the local outbound interface is congested. If the M outbound interfaces include a plurality of outbound interfaces of the shortest path, and a local outbound interface and an inter-chip outbound interface in the plurality of outbound interfaces of the shortest path each are in a non-congested state, the first chassis-shaped device selects the local outbound interface from the outbound interface of the shortest path in the M outbound interfaces as the target outbound interface. If the M outbound interfaces include a plurality of outbound interfaces of the shortest path, and in the plurality of outbound interfaces of the shortest path, a local outbound interface is in a congested state and an inter-chip outbound interface is in a non-congested state, the first chassis-shaped device selects the inter-chip outbound interface from the outbound interface of the shortest path in the M outbound interfaces as the target outbound interface. If the outbound interface of the shortest path in the M outbound interfaces is in a congested state, and a local outbound interface and an inter-chip outbound interface in the outbound interface of the non-shortest path in the M outbound interfaces each are in a non-congested state, the first chassis-shaped device selects the local outbound interface from the outbound interface of the non-shortest path in the M outbound interfaces as the target outbound interface.

In some embodiments, if a plurality of outbound interfaces with a same congested state and a same role exist in the M outbound interfaces, the first chassis-shaped device selects the target outbound interface based on a hash algorithm. The first chassis-shaped device calculates a hash value based on a characteristic value of the first data packet, and selects, from the plurality of outbound interfaces as the target outbound interface, an outbound interface to which the hash value is mapped.

S505: The first chassis-shaped device sends the first data packet to the second chassis-shaped device through the target outbound interface.

Optionally, the uplink chip, the switching board, and the downlink chip in the first chassis-shaped device perform cooperative processing, to implement the foregoing process of forwarding the first data packet. The uplink chip performs a process of receiving the first data packet, a process of obtaining the M outbound interfaces, and a process of selecting the target outbound interface. The downlink chip performs a process of sending the first data packet through the target outbound interface. The switching board forwards the first data packet between the uplink chip and the downlink chip.

For example, M outbound interfaces obtained by the uplink chip each are an outbound interface on the downlink chip. After selecting an outbound interface on a downlink chip as the target outbound interface, the uplink chip adds an identifier (e.g., a TB ID) of the downlink chip and an identifier (e.g., a TP ID) of the outbound interface to the first data packet, and sends a first data packet including the identifier of the downlink chip and the identifier of the outbound interface to the switching board. After receiving the first data packet including the identifier of the downlink chip and the identifier of the outbound interface, the switching board searches for a corresponding downlink chip based on the identifier of the downlink chip in the first data packet, and forwards the first data packet to the corresponding downlink chip. After receiving the first data packet including the identifier of the downlink chip and the identifier of the outbound interface, the downlink chip obtains the identifier of the outbound interface from the first data packet, searches for a corresponding outbound interface on the chip, and forwards the first data packet through the outbound interface.

Optionally, the uplink chip, the switching board, and the downlink chip communicate with each other based on a specified frame format. A process in which the uplink chip adds the identifier of the downlink chip and the identifier of the outbound interface to the first data packet is specifically as follows: The uplink chip encapsulates a frame header into the first data packet. The frame header includes the identifier of the downlink chip and the identifier of the outbound interface. After receiving the first data packet, the downlink chip obtains the identifier of the outbound interface from the frame header in the first data packet, and decapsulates, from the first data packet, the frame header including the identifier of the downlink chip and the identifier of the outbound interface.

S506: The second chassis-shaped device receives the first data packet.

S507: The second chassis-shaped device sends the first data packet to the second host.

In some embodiments, the second chassis-shaped device parses the first data packet, to obtain the destination IP address of the first data packet. The second chassis-shaped device searches, based on the destination IP address of the first data packet, a forwarding table stored in the second chassis-shaped device for an outbound interface of a shortest path corresponding to the destination IP address of the first data packet. The second chassis-shaped device sends the first data packet to the second host through the outbound interface of the shortest path.

S508: The second host receives the first data packet.

According to the method provided in this embodiment, in a process of forwarding a packet, a plurality of outbound interfaces corresponding to the packet are obtained from outbound interfaces of a plurality of forwarding chips included in a chassis-shaped device, a target outbound interface is selected based on whether each outbound interface is an outbound interface of a shortest path or an outbound interface of a non-shortest path and a congested state of each outbound interface, and the packet is sent through the target outbound interface. In this way, an application of an adaptive routing technology is extended to the chassis-shaped device. Further, the method is applied to a network in which chassis-shaped devices are interconnected. Because the chassis-shaped device has a higher integration degree than a case-shaped device, a device integration degree can be improved, and network power consumption and networking costs can be reduced.

The method shown in FIG. 7 is described by using, as an example, a packet forwarding procedure in which the first chassis-shaped device is a source chassis of a data packet. The following provides example descriptions of a packet forwarding procedure in which the first chassis-shaped device is an intermediate chassis of a data packet.

Figure 9:
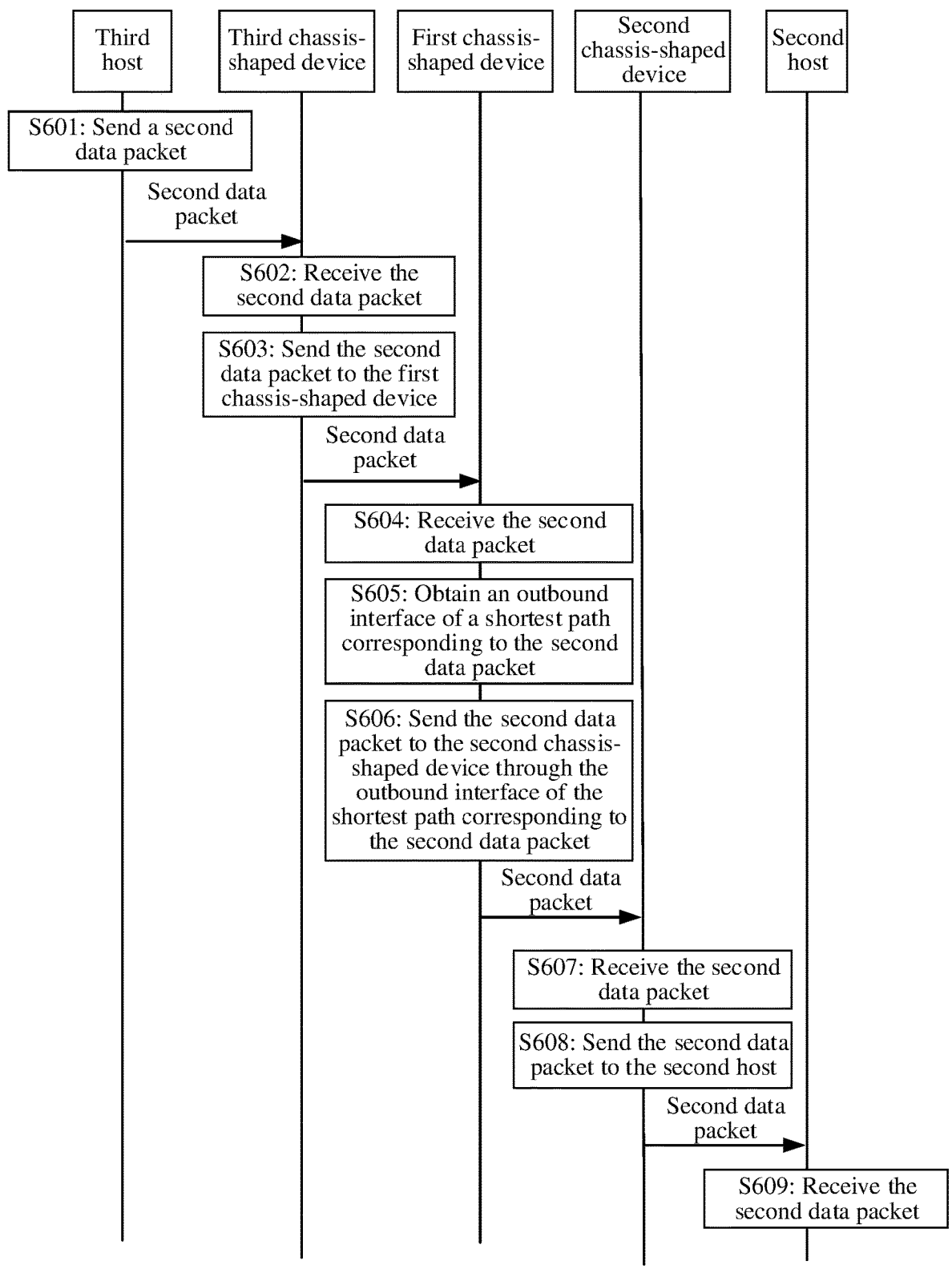
FIG. 9 is a flowchart of another packet forwarding method according to an embodiment of this application.

FIG. 9 is a flowchart of a packet forwarding method according to an embodiment of this application. A main difference between the method shown in FIG. 9 and the method shown in FIG. 7 lies in that, in the method shown in FIG. 7, a source chassis of a data packet is a first chassis-shaped device, but in the method shown in FIG. 9, a source chassis of a data packet is a third chassis-shaped device, and an intermediate chassis of the data packet is a first chassis-shaped device. The method shown in FIG. 9 includes S601 to S609.

S601: A third host sends a second data packet.

The third host is connected to the third chassis-shaped device, a source IP address of the second data packet is an IP address of the third host, and a destination IP address of the first data packet is an IP address of a second host.

S602: The third chassis-shaped device receives the second data packet.

S603: The third chassis-shaped device sends the second data packet to the first chassis-shaped device.

Optionally, the third chassis-shaped device selects, in an adaptive routing manner, an outbound interface based on a congested state of a path between the third chassis-shaped device and the first chassis-shaped device, to send the second data packet to the first chassis-shaped device. The third chassis-shaped device searches, based on the destination IP address of the second data packet, a forwarding table stored in the third chassis-shaped device for a route prefix that matches the destination IP address of the second data packet, to obtain M outbound interfaces corresponding to the route prefix. The third chassis-shaped device selects a target outbound interface from the M outbound interfaces based on a congested state of each of the M outbound interfaces and whether each of the M outbound interfaces is an outbound interface of a shortest path or an outbound interface of a non-shortest path. The third chassis-shaped device sends the second data packet to the first chassis-shaped device through the target outbound interface. For specific details of selecting the target outbound interface by the third chassis-shaped device, refer to step S504. Details are not described herein again.

S604: The first chassis-shaped device receives the second data packet from the third chassis-shaped device.

S605: The first chassis-shaped device obtains an outbound interface of a shortest path corresponding to the second data packet.

For example, the first chassis-shaped device determines, based on a case in which an inbound interface of the second data packet is a global port, that a to-be-queried forwarding table is a second forwarding table. The first chassis-shaped device searches, based on the destination IP address of the second data packet, a second forwarding table stored in the first chassis-shaped device for a route prefix that matches the destination IP address of the second data packet, to obtain an outbound interface of a shortest path corresponding to the route prefix.

S606: The first chassis-shaped device sends the second data packet to a second chassis-shaped device through the outbound interface of the shortest path corresponding to the second data packet.

S607: The second chassis-shaped device receives the second data packet.

S608: The second chassis-shaped device sends the second data packet to the second host.

S609: The second host receives the second data packet.

According to the method provided in this embodiment, when a chassis-shaped device is an intermediate chassis, the chassis-shaped device forwards a packet through a shortest path, to avoid a case in which the packet is forwarded from the intermediate chassis to another intermediate chassis through a non-shortest path, thereby effectively avoiding a loop.

The method shown in FIG. 7 and the method shown in FIG. 9 focus on a forwarding plane procedure, and describe how a forwarding chip of a chassis-shaped device forwards a packet in an adaptive routing manner. The following describes a control plane procedure, and describes how a chassis-shaped device advertises a route and delivers a forwarding entry. Optionally, the control plane procedure described below is performed before the method shown in FIG. 7 or the method shown in FIG. 9.

Figure 10:
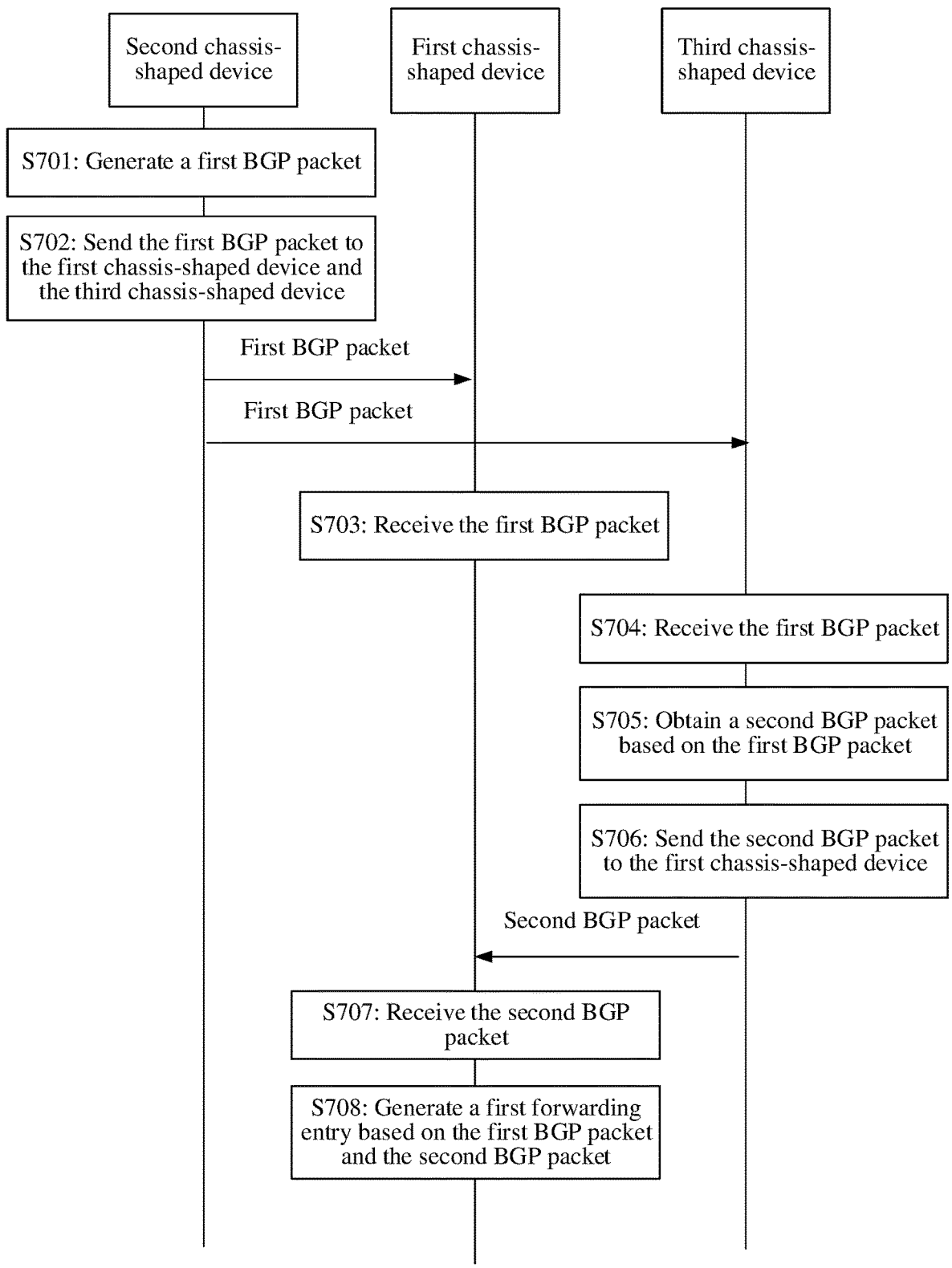
FIG. 10 is a flowchart of a forwarding entry generation method according to an embodiment of this application.

FIG. 10 is a flowchart of a forwarding entry generation method according to an embodiment of this application. The method shown in FIG. 10 includes S701 to S708.

S701: A second chassis-shaped device generates a first BGP packet.

The first BGP packet is used to advertise routing information destined for a second host.

The routing information in the first BGP packet includes a route prefix and an AS path (AS path) attribute.

The route prefix in the first BGP packet includes a prefix of an IP address of the second host. In a possible implementation, the second chassis-shaped device obtains the route prefix in a static configuration manner. In another possible implementation, the second chassis-shaped device interacts with the second host based on a routing protocol, to obtain the route prefix.

An autonomous system (AS) in the border gateway protocol (BGP) protocol is IP networks that are managed by an entity and that have a same routing policy. An AS number is an identifier allocated to the AS. The AS path attribute describes a path to a destination AS by using a string of AS numbers (AS number). A quantity of AS numbers in the AS path attribute indicates a length of the path. A smaller quantity of AS numbers in the AS path attribute indicates a shorter path to the destination AS.

In this embodiment, a chassis-shaped device is used as an AS, and an AS number is allocated to each chassis-shaped device in advance. For example, a network administrator configures a corresponding AS number on each chassis-shaped device. The AS path attribute of the first BGP packet includes an AS number of the second chassis-shaped device.

S702: The second chassis-shaped device sends the first BGP packet to a first chassis-shaped device and a third chassis-shaped device.

In a possible implementation, every two of the first chassis-shaped device, the second chassis-shaped device, and the third chassis-shaped device establish a global link, and an external BGP (eBGP) protocol runs on the global link. The second chassis-shaped device sends the first BGP packet to the first chassis-shaped device based on an EBGP protocol through a global link between the second chassis-shaped device and the first chassis-shaped device. The global link is a link interconnected between different chassis-shaped devices. The second chassis-shaped device sends the first BGP packet to the third chassis-shaped device based on the EBGP protocol through a global link between the second chassis-shaped device and the third chassis-shaped device. The second chassis-shaped device may send the first BGP packet to each of the first chassis-shaped device and the third chassis-shaped device in a unicast manner, or the second chassis-shaped device may send the first BGP packet to the first chassis-shaped device and the third chassis-shaped device in a multicast manner.

The EBGP protocol is a BGP protocol that runs between different ASs. In this embodiment, because three chassis-shaped devices, namely, the first chassis-shaped device, the second chassis-shaped device, and the third chassis-shaped device, are equivalent to three different ASs, the three chassis-shaped devices interact based on the EBGP protocol.

S703: The first chassis-shaped device receives the first BGP packet.

S704: The third chassis-shaped device receives the first BGP packet.

S705: The third chassis-shaped device obtains a second BGP packet based on the first BGP packet.

The second BGP packet includes a route prefix and an AS path attribute. The route prefix in the second BGP packet is the same as the route prefix in the first BGP packet. The AS path attribute of the second BGP packet includes the AS number of the second chassis-shaped device and an AS number of the third chassis-shaped device.

In a possible implementation, the third chassis-shaped device adds the AS number of the third chassis-shaped device to the AS path attribute in the first BGP packet, to obtain the second BGP packet.

S706: The third chassis-shaped device sends the second BGP packet to the first chassis-shaped device.

S707: The first chassis-shaped device receives the second BGP packet.

In some embodiments, a chassis-shaped device further checks whether a received BGP packet includes an AS number of the chassis-shaped device, to avoid a routing loop. A process in which the first chassis-shaped device checks the first BGP packet is used as an example. After receiving the first BGP packet, the first chassis-shaped device determines whether the AS path attribute in the first BGP packet includes an AS number of the first chassis-shaped device; and discards the first BGP packet if the AS path attribute in the first BGP packet includes the AS number of the first chassis-shaped device. Similarly, when receiving a BGP packet, another chassis-shaped device different from the first chassis-shaped device may check the BGP packet in a similar manner.

S708: The first chassis-shaped device generates a first forwarding entry based on the first BGP packet and the second BGP packet.

Optionally, a process of generating the first forwarding entry specifically includes step (1) to step (3).

Step (1): The first chassis-shaped device obtains a shortest path route based on the first BGP packet.

The shortest path route indicates a correspondence between the route prefix and an outbound interface of a shortest path. Optionally, the shortest path route is a route whose AS path length is 1, that is, a route whose quantity of AS numbers in the AS path attribute is 1.

In a possible implementation, the first chassis-shaped device obtains the route prefix and the AS path attribute from the first BGP packet. The first chassis-shaped device determines the quantity of AS numbers in the AS path attribute. If the first chassis-shaped device determines, based on a case in which the quantity of AS numbers in the first BGP packet is 1 and the AS number is not equal to an AS number of the first chassis-shaped device, that the routing information in the first BGP packet corresponds to the shortest path route, the first chassis-shaped device stores the routing information in the first BGP packet in a routing table, and marks a route including the routing information as the shortest path route. An outbound interface of the shortest path route is an outbound interface for receiving the first BGP packet.

Step (2): The first chassis-shaped device obtains a non-shortest path route based on the second BGP packet.

The non-shortest path route indicates a correspondence between a route prefix and an outbound interface of a non-shortest path. Optionally, the non-shortest path route corresponds to routing information indicating that an AS path length is 2, that is, routing information indicating that a quantity of AS numbers is 2 in the AS path attribute, and the AS path attribute does not include the AS number of the first chassis-shaped device.

In a possible implementation, the first chassis-shaped device obtains the route prefix and the AS path attribute from the second BGP packet. The first chassis-shaped device determines the quantity of AS numbers in the AS path attribute. If the first chassis-shaped device determines, based on a case in which the quantity of AS numbers in the second BGP packet is 2, that routing information in the second BGP packet corresponds to the non-shortest path route, the first chassis-shaped device stores the routing information in the second BGP packet in the routing table, and marks a route including the routing information in the second BGP packet as the non-shortest path route. The outbound interface of the non-shortest path is an outbound interface for receiving the second BGP packet.

Step (3): The first chassis-shaped device generates the first forwarding entry based on the shortest path route and the non-shortest path route.

In a possible implementation, the first chassis-shaped device allocates an ECMP group to the second chassis-shaped device, adds an outbound interface corresponding to a shortest path route advertised by the second chassis-shaped device and an outbound interface corresponding to a non-shortest path route advertised by the second chassis-shaped device to the ECMP group, identifies a role of the outbound interface corresponding to the shortest path route as the outbound interface of the shortest path, identifies a role of the outbound interface corresponding to the non-shortest path route as the outbound interface of the non-shortest path, and generates a correspondence among a route prefix, an ECMP group, and a role of an outbound interface in the ECMP group, to obtain the first forwarding entry shown in FIG. 8.

In some embodiments, a main control board in the first chassis-shaped device generates the first forwarding entry based on the first BGP packet and the second BGP packet, and the main control board sends the first forwarding entry to each of N forwarding chips. Each of the N forwarding chips receives and stores the first forwarding entry, to select a target outbound interface based on the first forwarding entry in a packet forwarding phase.

According to the method provided in this embodiment, chassis-shaped devices exchange a BGP packet to obtain a shortest path route and a non-shortest path route, generate a forwarding entry for adaptive routing, and deliver the forwarding entry to a forwarding chip, so that delivery of a routing entry is controlled based on a BGP routing protocol, to resolve a problem in the conventional technology that an adaptive routing protocol can be implemented based on only a proprietary routing protocol. In this way, the proprietary routing protocol does not need to be deployed on a device, to reduce implementation complexity. In addition, in this method, networking in a topology in which chassis-shaped devices are directly connected is implemented based on a standard IP and a standard BGP protocol, without depending on an infiniband or a proprietary interconnection technology. Therefore, implementation complexity is reduced, and flexibility and availability are improved.

The method shown in FIG. 10 is described by using an example in which a shortest path between the first chassis-shaped device and the second chassis-shaped device is a direct link, and a non-shortest path passes through one hop of intermediate node (the third chassis-shaped device). In this case, the quantity of AS numbers corresponding to the shortest path route is 1, and the quantity of AS numbers corresponding to the non-shortest path route is 2. In some other embodiments, the shortest path between the first chassis-shaped device and the second chassis-shaped device passes through at least one hop of intermediate node, and the non-shortest path passes through more intermediate nodes. In this case, the quantity of AS numbers corresponding to the shortest path route is greater than 1, and the quantity of AS numbers corresponding to the non-shortest path route is greater than 2. For example, if the shortest path between the first chassis-shaped device and the second chassis-shaped device passes through $j$ hops of intermediate nodes, the quantity of AS numbers corresponding to the shortest path route is (j+1), and the quantity of AS numbers corresponding to the non-shortest path route is an integer greater than (j+1). Herein, j is a positive integer, and j is, for example, preset.

The method shown in FIG. 10 is described by using, as an example, a process in which the first chassis-shaped device generates the first forwarding entry based on two BGP packets, namely, the first BGP packet and the second BGP packet. An ECMP group in the first forwarding entry includes two outbound interfaces. In some other embodiments, the first chassis-shaped device generates the first forwarding entry based on at least two BGP packets. The at least two BGP packets each come from a destination chassis-shaped device (e.g., source AS numbers of the at least two BGP packets each are the AS number of the second chassis-shaped device). The first chassis-shaped device generates the first forwarding entry based on the at least two BGP packets. An ECMP group in the first forwarding entry includes at least two outbound interfaces.

For example, the first chassis-shaped device and the second chassis-shaped device are not only connected through the third chassis-shaped device, but also connected through a fourth chassis-shaped device. To be specific, there are two non-shortest paths between the first chassis-shaped device and the second chassis-shaped device. An intermediate node through which one non-shortest path passes is the third chassis-shaped device, and an intermediate node through which the other non-shortest path passes is the fourth chassis-shaped device. In a route advertisement phase, the second chassis-shaped device not only sends the first BGP packet to the first chassis-shaped device and the third chassis-shaped device, but also sends the first BGP packet to the fourth chassis-shaped device. The fourth chassis-shaped device adds an AS number of the fourth chassis-shaped device to the first BGP packet, to obtain a third BGP packet. An AS path attribute in the third BGP packet includes the AS number of the second chassis-shaped device and the AS number of the fourth chassis-shaped device. The fourth chassis-shaped device sends the third BGP packet to the first chassis-shaped device. The first chassis-shaped device generates the first forwarding entry based on the first BGP packet, the second BGP packet, and the third BGP packet. The first chassis-shaped device obtains one shortest path route based on the first BGP packet, and obtains two non-shortest path routes based on the second BGP packet and the third BGP packet. An outbound interface of the non-shortest path route is an outbound interface through which the second BGP packet is received, and an outbound interface of the other non-shortest path route is an outbound interface through which the third BGP packet is received. The ECMP group in the first forwarding entry includes three outbound interfaces, a role of one of the three outbound interfaces is an outbound interface of the shortest path, and roles of the other two outbound interfaces are outbound interfaces of the non-shortest path routes.

In some embodiments, an intra-chassis inter-chip fault awareness and notification mechanism is further provided, to help the forwarding chip perform fast failure convergence when forwarding a packet.

For a forwarding chip i in the N forwarding chips, the forwarding chip i monitors whether each outbound interface of the forwarding chip i is faulty. If an outbound interface a of the forwarding chip i is faulty, the forwarding chip i generates a fault notification message, and sends the fault notification message to (N−1) other forwarding chips different from the forwarding chip i in the N forwarding chips. Each of the (N−1) other forwarding chips receives the fault notification message of the forwarding chip i, determines, based on the fault notification message, that the outbound interface a is faulty, and records a faulty state of the outbound interface a. The other forwarding chips query an ECMP group that includes the outbound interface a in a forwarding entry, and delete the outbound interface a from the ECMP group that include the outbound interface a.

The fault notification message indicates that the outbound interface a of the forwarding chip i is in the faulty state. The fault notification message includes at least one of an identifier of the forwarding chip i, an identifier of the outbound interface a, a faulty state identifier, and a message type.

Optionally, the fault notification message is a multicast message. For example, a multicast source corresponding to the fault notification message generated by the forwarding chip i is the forwarding chip i, and a multicast group is the (N−1) other forwarding chips different from the forwarding chip i in the N forwarding chips.

Optionally, the fault notification message is a unicast message. For example, the forwarding chip i generates (N−1) fault notification messages for the (N−1) other forwarding chips different from the forwarding chip i, and the forwarding chip i sends one fault notification message to each of the (N−1) other forwarding chips.

Optionally, a switching board forwards the fault notification message between different forwarding chips.

The following provides descriptions by using, as an example, a process of determining a faulty state of a first outbound interface of a first forwarding chip. The first forwarding chip is the forwarding chip i (that is, the first forwarding chip is any one of the N forwarding chips), and the first outbound interface is the outbound interface a.

For example, the first forwarding chip includes the first outbound interface, and the first outbound interface is configured to be connected to the second chassis-shaped device. The first forwarding chip generates a first notification message based on the faulty state of the first outbound interface. The first forwarding chip sends the first notification message to another forwarding chip different from the first forwarding chip in the N forwarding chips. The another forwarding chip receives the first notification message, and if determining, based on the first notification message, that the first outbound interface is in the faulty state, deletes the first outbound interface from an ECMP group in the first forwarding entry based on the first notification message.

Optionally, the first forwarding chip and the second forwarding chip are different forwarding chips. Alternatively, the first forwarding chip and the second forwarding chip are a same forwarding chip. In other words, one forwarding chip not only undertakes a task of notifying another forwarding chip of a congested state of an outbound interface of the chip, but also undertakes a task of notifying the another forwarding chip of a faulty state of the outbound interface of the chip.

The following provides example descriptions of the methods shown in FIG. 7, FIG. 9, and FIG. 10 with reference to a comprehensive instance.

Instance 1

Instance 1 relates to how to perform packet forwarding and routing control in a network shown in FIG. 6. For example, with reference to FIG. 6, the chassis-shaped device 301 in FIG. 6 is a source chassis, the chassis-shaped device 303 in FIG. 6 is a destination chassis, and the chassis-shaped device 302 in FIG. 6 is an intermediate chassis.

After a networking plan is determined, a user needs to configure a role of each interface of each chassis-shaped device. A port role of an interface used for an inter-chassis interconnection is a global port. A port role of an interface used to be connected to a server is an access port.

One BGP AS number is configured for each chassis-shaped device. For example, an AS number configured for the chassis-shaped device 301 is 100, an AS number configured for the chassis-shaped device 302 is 101, and an AS number configured for the chassis-shaped device 303 is 102. An EBGP protocol runs on a global link between different chassis-shaped devices.

Routing Control

The chassis-shaped device 303 advertises, based on an EBGP, a route prefix used by the chassis-shaped device 303 to be connected to a host 42. An AS path attribute of the route prefix includes an AS number (102) of the chassis-shaped device 303. The route is advertised to the chassis-shaped device 302 and the chassis-shaped device 301. A receiving chassis determines, based on an AS path length indicated by the AS path attribute, whether the route advertised by the chassis-shaped device 303 is a shortest path route or a non-shortest path route. The AS path attribute includes AS numbers of all chassis-shaped devices used in a route advertisement process. If a BGP AS path attribute includes only one AS number (that is, the route prefix corresponds to the shortest path route), the receiving chassis installs the route in both a forwarding table 1 and a forwarding table 2. Correspondingly, a forwarding entry includes the route prefix and a local outbound interface of the shortest path.

The forwarding table 1 is used for packet forwarding when a current device is an ingress node (a source chassis), to implement an adaptive routing function. To be specific, the shortest path or the non-shortest path is selected for packet forwarding based on a congested state of an outbound interface. The forwarding table 2 is used for packet forwarding when a current device is an egress node (a destination chassis) or an intermediate node (an intermediate chassis), and an outbound interface list of the forwarding table 2 includes an outbound interface of the shortest path but does not include an outbound interface of the non-shortest path.

The chassis-shaped device 302 continues to send, to the chassis-shaped device 301 based on the EBGP, the route advertised by the chassis-shaped device 303, and the chassis-shaped device 302 adds an AS number (101) of the chassis-shaped device 302 to the BGP AS path attribute. After receiving the route, the chassis-shaped device 301 determines, based on a case in which the BGP AS path attribute includes two AS numbers (an AS number of the destination chassis and an AS number of the intermediate chassis), that the route is a non-shortest path route, and the chassis-shaped device 301 installs the route in the forwarding table 1. The non-shortest path route and a corresponding shortest path route have a same route prefix, but have different outbound interfaces. Local outbound interfaces of the non-shortest path route and the shortest path route are combined and placed in a same ECMP group. A control plane (that is, a main control board) delivers the route prefix and the corresponding ECMP group to a forwarding plane (that is, a forwarding chip), and marks a role of each member in the ECMP group as a shortest path or a non-shortest path, so that during forwarding, the forwarding chip preferentially selects an outbound interface of the shortest path for forwarding.

Each ECMP group has an ID. The route prefix is indexed to a corresponding ECMP group based on the ID. When generating a forwarding entry in the forwarding table 1, the control plane (that is, the main control board) generates an ECMP group based on each destination chassis-shaped device, to reduce processing and storage resources used by a chassis-shaped device to maintain the ECMP group. Because the chassis-shaped device and the AS number are in a one-to-one correspondence, when receiving a route, the chassis-shaped device 301 allocates an ECMP group based on a source AS number of the route. For example, the chassis-shaped device 301 allocates an ECMP group 1 to all routes advertised by a destination chassis whose BGP AS number is 100, and allocates an ECMP group 2 to all routes advertised by a destination chassis whose BGP AS number is 101.

For example, if an entire network includes 289 ECMP groups, each chassis-shaped device generates forwarding entries corresponding to 288 ECMP groups. The forwarding entries respectively correspond to 288 other connected ECMP groups. Each ECMP group includes a plurality of member interfaces, and the plurality of member interfaces are separately local outbound interfaces corresponding to a shortest path and a non-shortest path. For example, in the forwarding table 1 of the chassis-shaped device 301, a forwarding entry destined for D (e.g., a prefix 20.1.1.1/24) points to an ECMP group. The ECMP group includes two members: an interface 11 and an interface 10. The interface 11 and the interface 10 respectively correspond to outbound interfaces of the shortest path and the non-shortest path during forwarding of the chassis-shaped device 301.

"11" in the interface 11 and "10" in the interface 10 are interface IDs obtained by the chassis-shaped device through unified addressing for all interfaces included in the device. When the main control board delivers the forwarding entry to the forwarding chip, a form of an interface ID is usually converted into a TB ID and a TP ID.

The TB ID is an ID of the forwarding chip, and the TP ID is a local interface ID of the forwarding chip. For example, a TB ID and a TP ID of the interface 11 are respectively 2 and 1, and a TB ID and a TP ID of the interface 10 are respectively 2 and 2.

Congestion Awareness

The following describes two methods in which the forwarding chip is aware of a congested state of an interconnection link.

Method 1: A switching chip back presses a congested state of an outbound interface to an uplink chip.

The uplink chip maintains a VOQ for each outbound interface. If an outbound interface of an inter-chassis interconnection link is congested, the switching chip back presses a congested state to the uplink chip. Consequently, packets in the VOQ queue are backlogged. The VOQ is an independent queue maintained by the chassis-shaped device for different outbound interfaces. The VOQ buffers ingress traffic before the ingress traffic enters the switching board, to avoid head-of-line (HOL) blocking. In a direction to an egress, a scheduler schedules a service flow corresponding to an ingress VOQ, and sends permitted credit values (credits) of different bandwidths to all service flows flowing to the egress, to accurately allocate a bandwidth based on a user service level agreement (SLA) and ensure quality of service (QOS).

During route forwarding, the uplink chip determines a queue depth of the VOQ corresponding to the outbound interface. If the queue depth of the VOQ exceeds a configured threshold, the uplink chip determines that the outbound interface corresponding to the VOQ is congested. If there are a plurality of outbound interfaces of a shortest path, the uplink chip selects the remaining outbound interfaces of the shortest path for forwarding. If all outbound interfaces of the shortest path are congested, the uplink chip selects an outbound interface of a non-shortest path for forwarding.

Method 2: An uplink chip is notified of a congested state of an outbound interface by using a congestion notification message.

Each forwarding chip monitors a congested state of a local global port. Each forwarding chip determines the congested state of the global port based on a queue depth or bandwidth utilization, and then each forwarding chip sends the congested state to another forwarding chip in the chassis-shaped device by using a multicast message or a unicast message. The notification message includes a message type, a congestion degree, an identifier (ID) of the forwarding chip, and an ID of the global port. The message type indicates that the message is a congestion notification message. Optionally, for the congestion degree, a plurality of bits are used to identify light load, moderate congestion, heavy congestion, or the like. After receiving the congestion notification message, the forwarding chip records a congestion degree of the outbound interface based on the congestion notification message.

If the congested state is notified by using the multicast message, the main control board delivers a multicast forwarding entry to the switching board in advance. An outbound interface list of the multicast forwarding entry includes an interface connected to each forwarding chip.

For example, with reference to FIG. 6, a global port of the chassis-shaped device 301 includes an interface 10 and an interface 11 of a forwarding chip 2.

The forwarding chip 2 monitors a congested state of the interface 10 and a congested state of the interface 11. When the interface 10 of the forwarding chip 2 is congested, the forwarding chip 2 generates a notification message, and sends the notification message to a forwarding chip 1. The notification message includes a TB ID of the forwarding chip 2, a TP ID of the interface 10, and a congestion degree. After receiving the notification message sent by the forwarding chip 2, the forwarding chip 1 records a congested state of the interface 10 in a forwarding table.

Fault Management

Each forwarding chip monitors a faulty state of a local global port. If the global port is faulty, the forwarding chip sends the faulty state of the global port to another forwarding chip in the chassis-shaped device by using a multicast message. The another forwarding chip records the faulty state of the outbound interface, and deletes the outbound interface from members in an ECMP group.

For example, with reference to FIG. 6, the forwarding chip 2 monitors a faulty state of the interface 10 and a faulty state of the interface 11. When the interface 10 of the forwarding chip 2 is congested, the forwarding chip 2 generates a notification message, and sends the notification message to the forwarding chip 1. The notification message includes a TB ID of the forwarding chip 2, a TP ID of the interface 10, and an identifier of the faulty state. After receiving the notification message sent by the forwarding chip 2, the forwarding chip 1 deletes the interface 10 from the ECMP group in a forwarding table stored by the forwarding chip 1.

Packet Forwarding

After receiving a packet from a server, the source chassis (the chassis-shaped device 301) searches the forwarding table 1. The source chassis (the chassis-shaped device 301) obtains a corresponding ECMP group and a member interface in the ECMP group (that is, an outbound interface included in the ECMP group) based on a group ID of the ECMP group, and then performs forwarding control based on a congested state of the member interface.

If the ECMP group includes only one outbound interface of a shortest path, and the outbound interface has light load, the source chassis (the chassis-shaped device 301) forwards a packet through the outbound interface.

If the ECMP group includes a plurality of outbound interfaces of a shortest path and each outbound interface has light load, the source chassis (the chassis-shaped device 301) preferentially selects a local outbound interface of a chip for forwarding. When the local outbound interface is congested, the source chassis (the chassis-shaped device 301) selects an inter-chip outbound interface of the shortest path for forwarding. If the source chassis (the chassis-shaped device 301) includes a plurality of local outbound interfaces or inter-chip outbound interfaces, the source chassis (the chassis-shaped device 301) performs hash calculation on a packet, and selects any outbound interface to send the packet.

If the ECMP group includes one or more outbound interfaces of a shortest path, but these outbound interfaces are all congested, the source chassis (the chassis-shaped device 301) selects an outbound interface with light load from remaining outbound interfaces of a non-shortest path for forwarding, and also preferentially selects a local outbound interface of a chip for forwarding, and secondarily selects an inter-chip outbound interface of a non-shortest path for forwarding. When there are a plurality of outbound interfaces, the source chassis (the chassis-shaped device 301) performs hash calculation among the plurality of outbound interfaces, and randomly selects an outbound interface to forward a packet.

The packet arrives at an intermediate chassis (the chassis-shaped device 302) through an interface of the non-shortest path. The intermediate chassis (the chassis-shaped device 302) searches a forwarding table 2 stored in the intermediate chassis, and the intermediate chassis (the chassis-shaped device 302) sends the packet to a destination chassis (the chassis-shaped device 303) through the shortest path, to ensure that the packet is forwarded through the intermediate chassis for only one time, and avoid a case in which when the intermediate chassis forwards the packet, the packet is forwarded to another intermediate chassis through the non-shortest path, and a routing loop is formed.

The packet arrives at the destination chassis (the chassis-shaped device 303) through the interface of the shortest path. The destination chassis (the chassis-shaped device 303) searches the forwarding table 2 stored in the destination chassis, and sends the packet to a destination server.

Compared with fat-tree networking, in the method provided in Instance 1, networking costs and a packet forwarding delay can be reduced. Compared with case-shaped direct networking, in the method provided in Instance 1, the chassis-shaped network has a high integration degree, to reduce networking costs and overall power consumption.

Figure 11:
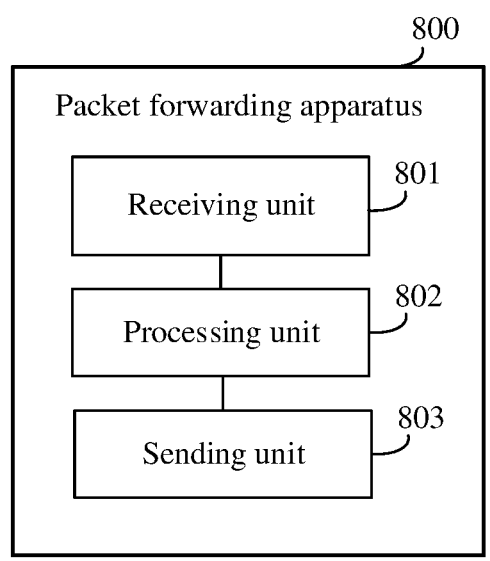
FIG. 11 is a schematic diagram of a structure of a packet forwarding apparatus according to an embodiment of this application.

FIG. 11 is a schematic diagram of a structure of a packet forwarding apparatus 800 according to an embodiment of this application. The packet forwarding apparatus 800 includes a receiving unit 801, a processing unit 802, and a sending unit 803.

Optionally, with reference to the networking architecture shown in FIG. 1, the packet forwarding apparatus 800 shown in FIG. 11 is disposed on one or more of the P chassis-shaped devices in FIG. 1.

Optionally, with reference to the networking architecture shown in FIG. 2, the packet forwarding apparatus 800 shown in FIG. 11 is disposed on one or more of the P chassis-shaped devices in FIG. 1.

Optionally, with reference to the networking architecture shown in FIG. 3, the packet forwarding apparatus 800 shown in FIG. 11 is disposed on one or more of the 288 chassis-shaped devices in FIG. 1.

Optionally, with reference to the chassis-shaped device 200 shown in FIG. 4, the packet forwarding apparatus 800 shown in FIG. 11 is disposed on the chassis-shaped device 200 shown in FIG. 4, for example, disposed on the forwarding chip 231.

Optionally, with reference to the chassis-shaped device shown in FIG. 5, the packet forwarding apparatus 800 shown in FIG. 11 is disposed on the chassis-shaped device shown in FIG. 5.

Optionally, with reference to a networking architecture shown in FIG. 6, the packet forwarding apparatus 800 shown in FIG. 11 is disposed on the chassis-shaped device 301, the chassis-shaped device 302, or the chassis-shaped device 303 in FIG. 6.

Optionally, with reference to FIG. 7, the packet forwarding apparatus 800 shown in FIG. 11 is configured to implement the procedure of the method shown in FIG. 7. The receiving unit 801 is configured to support the packet forwarding apparatus 800 to perform S502. The processing unit 802 is configured to support the packet forwarding apparatus 800 to perform S503 to S504. The sending unit 803 is configured to support the packet forwarding apparatus 800 to perform S505.

Optionally, with reference to FIG. 8, the processing unit 802 includes the BGP protocol and route delivery module in FIG. 8. The processing unit 802 is configured to generate the route prefix entry and the ECMP group entry in FIG. 8.

Optionally, with reference to FIG. 9, the packet forwarding apparatus 800 shown in FIG. 11 is configured to implement the procedure of the method shown in FIG. 9. The receiving unit 801 is configured to support the packet forwarding apparatus 800 to perform S604. The processing unit 802 is configured to support the packet forwarding apparatus 800 to perform S605. The sending unit 803 is configured to support the packet forwarding apparatus 800 to perform S606.

Optionally, with reference to FIG. 10, the packet forwarding apparatus 800 shown in FIG. 11 is configured to implement the procedure of the method shown in FIG. 10. For example, when the packet forwarding apparatus 800 is configured to perform a procedure implemented by the second chassis-shaped device, the receiving unit 801 is configured to perform S701, and the sending unit 803 is configured to perform S702. When the packet forwarding apparatus 800 is configured to perform a procedure implemented by the first chassis-shaped device, the receiving unit 801 is configured to perform S703 and S707, and the processing unit 802 is configured to perform S708. When the packet forwarding apparatus 800 is configured to perform a procedure implemented by the second chassis-shaped device, the receiving unit 801 is configured to perform S704, the processing unit 802 is configured to perform S705, and the sending unit 803 is configured to perform S706.

The apparatus embodiment described in FIG. 11 is merely an example. For example, division into the units is merely logical function division and may be other division in an actual implementation. For example, a plurality of units or components may be combined or integrated into another system, or some features may be ignored or not performed. In addition, various functional units in various embodiments of this application may be integrated into one processing unit, or each of the units may exist alone physically, or two or more units are integrated into one unit.

All or some of the units of the packet forwarding apparatus 800 are implemented by using software, hardware, firmware, or any combination thereof.

When the units of the packet forwarding apparatus 800 are implemented by using software, for example, the processing unit 802 is implemented by using a software functional unit generated after a processor in a forwarding chip in FIG. 4 reads program code stored in a memory in the forwarding chip. For another example, the processing unit 802 is implemented by using a software functional unit generated after the central processing unit 211 in the main control board 210 reads program code stored in the memory 212 in the main control board 210 in FIG. 4.

When the units of the packet forwarding apparatus 800 are implemented by using hardware, for example, the units in FIG. 11 are separately implemented by using different hardware of the chassis-shaped device. For example, the processing unit 802 is implemented by using some processing resources in at least one processor Z01 in a forwarding chip (e.g., one or two cores in a multi-core processor), or may be completed by using a programmable device such as a field-programmable gate array (FPGA) or a coprocessor. The receiving unit 801 and the sending unit 803 are implemented by a network interface of a forwarding chip.

The embodiments of this specification are described in a progressive way. For same or similar parts in the embodiments, refer to each other. Each embodiment focuses on a difference from another embodiment.

That A is B means that A is the same as B or A is a simple deformation of B.

In the specification and claims of embodiments of this application, the terms "first", "second", and the like are intended to distinguish different objects but do not indicate a particular order of the objects, and it cannot be understood as indicating or implying relative importance. For example, the first data packet and the second data packet are used to distinguish different data packets, but are not used to describe a specific order of data packets, and it cannot be understood that the first data packet is more important than the second data packet.

In embodiments of this application, unless otherwise specified, "at least one" means one or more, and "a plurality of" means two or more. For example, a plurality of data packets are two or more data packets.

All or some of the foregoing embodiments may be implemented by using software, hardware, firmware, or any combination thereof. When software is used to implement the embodiments, all or a part of the embodiments may be implemented in a form of a computer program product. The computer program product includes one or more computer instructions. When the computer program instructions are loaded and executed on a computer, all or some procedures or functions in embodiments of this application are generated. The computer may be a general-purpose computer, a dedicated computer, a computer network, or any other programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (e.g., a coaxial cable, an optical fiber, or a digital subscriber line (DSL)) or wireless (e.g., infrared, radio, or microwave) manner. The computer-readable storage medium may be any usable medium accessible by the computer, or a data storage device, such as a server or a data center, integrating one or more usable media. The usable medium may be a magnetic medium (e.g., a floppy disk, a hard disk, or a magnetic tape), an optical medium (e.g., a DVD), a semi-conductor medium (e.g., a solid-state drive (SSD)), or the like.

The foregoing embodiments are merely used to describe the technical solutions of this application, but are not intended to limit the technical solutions. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of embodiments of this application.

What is claimed is:

1. A packet forwarding method performed by a first chassis-shaped device comprising N forwarding chips, where N is greater than or equal to 2, and wherein the method comprises:
   receiving a first data packet from a first host;
   obtaining M outbound interfaces corresponding to the first data packet, where M is greater than or equal to 2;
   selecting a target outbound interface, from the M outbound interfaces, based on both:
      a congested state of each of the M outbound interfaces, and
      a role of each outbound interface, wherein the role comprises:
         an outbound interface of a shortest path between the first chassis-shaped device and a second chassis-shaped device, and
         an outbound interface of a non-shortest path between the first chassis-shaped device and the second chassis-shaped device; and
   sending, in accordance with the selecting, the first data packet to the second chassis-shaped device through the target outbound interface,
   wherein the shortest path is a direct link between the first chassis-shaped device and the second chassis-shaped device,
   wherein the non-shortest path is a path connecting the first chassis-shaped device and the second chassis-shaped device through a third chassis-shaped device, and
   wherein before the selecting a target outbound interface, the method further comprises:
      determining the role of each of the M outbound interfaces based on a destination Internet protocol (IP) address of the first data packet and a first forwarding entry stored in the first chassis-shaped device,
   wherein the first forwarding entry comprises a correspondence among:
      a route prefix,
      an equal-cost multi-path (ECMP) group, and
      a role of an outbound interface in the ECMP group:
   wherein the route prefix comprises a prefix of the destination IP address of the first data packet, and
   wherein the ECMP group comprises the M outbound interfaces.

2. The method according to claim 1, wherein before the determining the role of each of the M outbound interfaces, the method further comprises:
   receiving a plurality of border gateway protocol (BGP) packets from the second chassis-shaped device, wherein each of the plurality of BGP packets comprises the route prefix and an autonomous system (AS) path attribute; and
   generating the first forwarding entry based on route prefixes and AS path attributes in the plurality of BGP packets.

3. The method according to claim 2, wherein the plurality of BGP packets comprise a first BGP packet and a second BGP packet, wherein a quantity of AS numbers in an AS path attribute of the first BGP packet is a specified quantity, wherein a quantity of AS numbers in an AS path attribute of the second BGP packet is greater than the specified quantity, and wherein the generating the first forwarding entry based on the plurality of BGP packets comprises:
   obtaining a shortest path route based on the first BGP packet, wherein the shortest path route indicates a correspondence between the route prefix and the outbound interface of the shortest path;
   obtaining a non-shortest path route based on the second BGP packet, wherein the non-shortest path route indicates a correspondence between the route prefix and the outbound interface of the non-shortest path; and
   generating the first forwarding entry based on the shortest path route and the non-shortest path route.

4. The method according to claim 3, wherein the AS number in the AS path attribute of the first BGP packet is an AS number of the second chassis-shaped device, and wherein the AS number in the AS path attribute of the second BGP packet is an AS number of the second chassis-shaped device and an AS number of the third chassis-shaped device.

5. The method according to claim 1, wherein before the determining the role of each of the M outbound interfaces, and wherein the method further comprises: allocating the ECMP group to the second chassis-shaped device.

6. The method according to claim 5, wherein the ECMP group comprises a first outbound interface of a first forwarding chip, and wherein the first outbound interface is configured to be connected to the second chassis-shaped device, the first forwarding chip is any one of the N forwarding chips, and the method further comprises:
   receiving a first notification message from the first forwarding chip that indicates that the first outbound interface of the first forwarding chip is in a faulty state; and
   deleting, based on the first notification message, the first outbound interface from the ECMP group in the first forwarding entry.

7. The method according to claim 6, wherein in accordance with the outbound interface of the shortest path being in a non-congested state, and wherein the target outbound interface is the outbound interface of the shortest path.

8. The method according to claim 7, wherein the M outbound interfaces comprise a plurality of outbound interfaces of the shortest path between the first chassis-shaped device and the second chassis-shaped device,
   wherein the plurality of outbound interfaces of the shortest path comprise a local outbound interface and an inter-chip outbound interface, and
   wherein, in accordance with the local outbound interface and the inter-chip outbound interface each being in a non-congested state:
      the target outbound interface is the local outbound interface,
      the local outbound interface is an outbound interface of a forwarding chip that receives the first data packet in the first chassis-shaped device, and the inter-chip outbound interface is an outbound interface of another forwarding chip different from the forwarding chip that receives the first data packet in the first chassis-shaped device.

9. The method according to claim 1, wherein in accordance with the outbound interface of the shortest path being in a congested state, the target outbound interface is an outbound interface in a non-congested state in the outbound interface of the non-shortest path.

10. The method according to claim 9, wherein in accordance with the outbound interface of the shortest path being in the congested state and a local outbound interface and an inter-chip outbound interface in the outbound interface of the non-shortest path each being in a non-congested state:
the target outbound interface is the local outbound interface in the outbound interface of the non-shortest path,
the local outbound interface is an outbound interface of a forwarding chip that receives the first data packet in the first chassis-shaped device, and
the inter-chip outbound interface is an outbound interface of another forwarding chip different from the forwarding chip that receives the first data packet in the first chassis-shaped device.

11. The method according to claim 1, wherein the N forwarding chips comprise a second forwarding chip, wherein the second forwarding chip comprises a second outbound interface that is configured to be connected to the second chassis-shaped device, and wherein before the selecting a target outbound interface from the M outbound interfaces based on a congested state of each of the M outbound interfaces and a role of each outbound interface, the method further comprises:
receiving a second notification message from the second forwarding chip, wherein the second notification message indicates a congested state of the second outbound interface of the second forwarding chip; and
recording the congested state of the second outbound interface based on the second notification message.

12. The method according to claim 11, wherein the second notification message is generated by the second forwarding chip in accordance with an event taken from the group consisting of:
a queue depth of the second outbound interface exceeding a depth threshold; and
bandwidth utilization of the second outbound interface exceeds a bandwidth utilization threshold.

13. The method according to claim 11, wherein the second notification message comprises: an identifier of the second forwarding chip, an identifier of the second outbound interface, and a congested state identifier.

14. The method according to claim 1, wherein the N forwarding chips comprise a second forwarding chip that comprises a second outbound interface, wherein the second outbound interface is configured to be connected to the second chassis-shaped device, and wherein before the selecting a target outbound interface, the method further comprises:
creating a virtual output queue (VOQ) for the second outbound interface; and
determining a congested state of the second outbound interface based on a queue depth of the VOQ.

15. The method according to claim 14, wherein the first chassis-shaped device further comprises a switching chip, and
wherein the method further comprises updating, using the switching chip, the queue depth of the VOQ based on the congested state of the second outbound interface.

16. A packet forwarding apparatus incorporated into a first chassis-shaped device, wherein the first chassis-shaped device comprises N forwarding chips, where N is greater than or equal to 2, and the apparatus comprises a processing unit and receiving and sending interfaces that cooperatively operate to carry out a method comprising:
receiving a first data packet from a first host;
obtaining M outbound interfaces corresponding to the first data packet, where M is greater than or equal to 2,
selecting a target outbound interface, from the M outbound interfaces, based on both:
a congested state of each of the M outbound interfaces, and
a role of each outbound interface, wherein the role comprises:
an outbound interface of a shortest path between the first chassis-shaped device and a second chassis-shaped device, and
an outbound interface of a non-shortest path between the first chassis-shaped device and the second chassis-shaped device; and
sending, in accordance with the selecting, the first data packet to the second chassis-shaped device through the target outbound interface,
wherein the shortest path is a direct link between the first chassis-shaped device and the second chassis-shaped device,
wherein the non-shortest path is a path connecting the first chassis-shaped device and the second chassis-shaped device through a third chassis-shaped device, and
wherein before the selecting a target outbound interface, the method further comprises:
determining the role of each of the M outbound interfaces based on a destination Internet protocol (IP) address of the first data packet and a first forwarding entry stored in the first chassis-shaped device, wherein the first forwarding entry comprises a correspondence among:
a route prefix,
an equal-cost multi-path (ECMP) group, and a role of an outbound interface in the ECMP group;
wherein the route prefix comprises a prefix of the destination IP address of the first data packet, and
wherein the ECMP group comprises the M outbound interfaces.

17. The packet forwarding apparatus of claim 16, wherein before the determining the role of each of the M outbound interfaces, the method further comprises:
receiving a plurality of border gateway protocol (BGP) packets from the second chassis-shaped device, wherein each of the plurality of BGP packets comprises the route prefix and an autonomous system (AS) path attribute; and
generating the first forwarding entry based on route prefixes and AS path attributes in the plurality of BGP packets.

18. A chassis-shaped device, wherein the chassis-shaped device comprises N forwarding chips and at least one primary processing chip, where N is greater than or equal to 2, and wherein the chassis-shaped device is configured to perform a method comprising:
receiving a first data packet from a first host;
obtaining M outbound interfaces corresponding to the first data packet, where M is greater than or equal to 2,
selecting a target outbound interface, from the M outbound interfaces, based on both:

a congested state of each of the M outbound interfaces, and a role of each outbound interface, wherein the role comprises:

an outbound interface of a shortest path between the first chassis-shaped device and a second chassis-shaped device, and an outbound interface of a non-shortest path between the first chassis-shaped device and the second chassis-shaped device; and sending, in accordance with the selecting, the first data packet to the second chassis-shaped device through the target outbound interface, wherein the shortest path is a direct link between the first chassis-shaped device and the second chassis-shaped device, wherein the non-shortest path is a path connecting the first chassis-shaped device and the second chassis-shaped device through a third chassis-shaped device, and wherein before the selecting a target outbound interface, the method further comprises:

determining the role of each of the M outbound interfaces based on a destination Internet protocol (IP) address of the first data packet and a first forwarding entry stored in the first chassis-shaped device, wherein the first forwarding entry comprises a correspondence among:

a route prefix, an equal-cost multi-path (ECMP) group, and a role of an outbound interface in the ECMP group:

wherein the route prefix comprises a prefix of the destination IP address of the first data packet, and wherein the ECMP group comprises the M outbound interfaces.

19. The chassis-shaped device according to claim 18, wherein the chassis-shaped device comprises one or more interface boards, and the N forwarding chips are disposed on different interface boards or a same interface board.

20. The chassis-shaped device according to claim 18, wherein before the determining the role of each of the M outbound interfaces, the method further comprises:

receiving a plurality of border gateway protocol (BGP) packets from the second chassis-shaped device, wherein each of the plurality of BGP packets comprises the route prefix and an autonomous system (AS) path attribute; and generating the first forwarding entry based on route prefixes and AS path attributes in the plurality of BGP packets.

* * * * *